(12) United States Patent
Di Cairano et al.

(10) Patent No.: US 9,915,948 B2
(45) Date of Patent: Mar. 13, 2018

(54) SYSTEM AND METHOD FOR CONTROLLING MOTION OF VEHICLE

(71) Applicant: Mitsubishi Electric Research Laboratories, Inc., Cambridge, MA (US)

(72) Inventors: Stefano Di Cairano, Somerville, MA (US); Uroš Kalabić, Roslindale, MA (US); Karl Berntorp, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 48 days.

(21) Appl. No.: 15/210,299

(22) Filed: Jul. 14, 2016

(65) Prior Publication Data
US 2018/0017971 A1   Jan. 18, 2018

(51) Int. Cl.
*G05D 1/00* (2006.01)
*G05D 1/02* (2006.01)

(52) U.S. Cl.
CPC ......... *G05D 1/0088* (2013.01); *G05D 1/0212* (2013.01); *G05D 2201/0213* (2013.01)

(58) Field of Classification Search
CPC ............... G05D 1/0088; G05D 1/0212; G05D 2201/0213
See application file for complete search history.

(56) References Cited

U.S. PATENT DOCUMENTS

| 6,134,486 | A | 10/2000 | Kanayama | |
|---|---|---|---|---|
| 6,321,159 | B1 | 11/2001 | Nohtomi et al. | |
| 7,974,748 | B2 * | 7/2011 | Goerick | B60K 28/165 701/28 |
| 8,948,954 | B1 | 2/2015 | Ferguson et al. | |
| 9,387,866 | B1 | 7/2016 | Di Cairano et al. | |
| 2009/0287376 | A1 | 11/2009 | Aso | |
| 2009/0319059 | A1 * | 12/2009 | Renfro | G05B 17/02 700/30 |
| 2013/0179036 | A1 | 7/2013 | Lee et al. | |
| 2014/0371992 | A1 | 12/2014 | Di Cairano et al. | |

(Continued)

*Primary Examiner* — Anne M Antonucci
(74) *Attorney, Agent, or Firm* — Gene Vinokur; James McAleenan; Hironori Tsukamoto

(57) ABSTRACT

A method selects from a memory a first model of motion of vehicle, a second model of the motion of the vehicle, a first constraint on the first model for moving along a desired trajectory of the vehicle, and a control invariant set joining states of the first model with states of the second model. For each combination of the states within the control invariant subset there is at least one control action to the second model that maintains the state of the second model within the control invariant set for every modification of the state of the first model satisfying the first constraint. A portion of the desired trajectory satisfying the first constraint is determined using the first model while a sequence of commands for moving the vehicle along the portion of the desired trajectory is determined using the second model. The sequence of commands is determined to maintain the sequence of the states of the second model and a sequence of the states of the first model determined by the portion of the desired trajectory within the control invariant subset. The vehicle is controlled using at least one command from the sequence of commands.

20 Claims, 16 Drawing Sheets

(56) References Cited

U.S. PATENT DOCUMENTS

| | | |
|---|---|---|
| 2015/0158528 A1 | 6/2015 | Moschuk et al. |
| 2015/0259006 A1 | 9/2015 | Inoue |
| 2015/0307110 A1* | 10/2015 | Grewe ................ B60W 50/029 701/36 |
| 2016/0147921 A1* | 5/2016 | Vanholme ........... B60W 50/029 703/6 |
| 2016/0152269 A1* | 6/2016 | Maurer ................ B60W 30/09 701/41 |

* cited by examiner

SYSTEM AND METHOD FOR CONTROLLING MOTION OF VEHICLE

FIELD OF THE INVENTION

This invention is related to controlling motion of vehicles automotive vehicles, and specifically to controlling a vehicle to follow a desired trajectory.

BACKGROUND

In advanced driver assistance (ADA) features and autonomous driving (AD) features, a control system controls the vehicle to achieve desired objectives. Examples of such objectives are to maintain the current lane, to change to a different lane, to avoid an obstacle, or to drive to a specific location while enforcing traffic rules.

The objective may be represented as a path or trajectory that the vehicle has to follow. For example, the trajectory can be generated by a decision making method, a path planner, a navigation system. In order to actually accomplish the objective, the vehicle must be controlled to actually follow the generated trajectory. For instance, the vehicle controller (VC) can receive the trajectory from, e.g., a supervisory controller (SC), and decides the steering commands that result in the vehicle following the trajectory. The VC commands are received by the actuator controller (AC), for instance in the electric power steering module, and actuated by the appropriate electromechanical devices, resulting in changing to the motion of the vehicle, in a way that makes the vehicle follow the SC trajectory. To that end, different components or layers of vehicle control, such as SC, VC, and AC, need to be properly coordinated to work together for a common objective. For example each higher layer needs to account for the behavior of the lower layer in producing its computations. Such coordination is generally difficult.

For example, in the coordination of the SC and VC, there is no guarantee that the vehicle can exactly execute the SC trajectory. This may be due to the SC using a simplified model of the vehicle motion to generate the trajectory, which for instance ignores phenomena such as longitudinal and lateral slip, or road friction, or road slope, in order to more quickly perform the trajectory computations. Also, this may be due to the presence of external factors, such as tire wear, different distance of front and rear axles from center of mass, etc., that may be unknown or not accounted by the SC. Thus, there is a need for cooperative control of different components of the vehicle having a common objective of moving the vehicle according to a desired trajectory.

SUMMARY

Some embodiments are based on recognition that performance of the motion of the vehicle following a trajectory depends on the objective of the motion. For example, performance of the motion of the vehicle following the trajectory needs to satisfy a measure of performance (M) that depends on the current objective of the motion. For example, in some situations the vehicle does not have to follow the desired trajectory exactly, but the maximum difference between the actual trajectory of the vehicle and the desired trajectory needs to be less than a threshold. Some embodiments are based on recognition that such a measure of performance can result from the actual practicalities of controlling the vehicle, but also can be accounted while generating the desired trajectory for the objective of the motion. For example, if the objective of the motion is lane keeping, all possible desired trajectories need to have a safety margin from the border of the lane equal to or greater than the threshold. Similarly, if the objective of the motion is the collision avoidance, all possible desired trajectories need to keep a safety distance margin from an obstacle, equal or greater than the threshold.

Thus, the measure of performance M that needs to be achieved while controlling the vehicle along the desired trajectory is connected to the type of desired trajectory allowed to be generated. To that end, the generation of the desired trajectory and the vehicle control according to the desired trajectory are not just sequential, but mutually dependent processes. For example, if the desired trajectory is generated by a supervisory controller (SC), and the motion of the vehicle along the desired trajectory is controlled by a vehicle controller (VC), the cooperation between the SC and VC can include a mutual dependency that if SC generates a desired trajectory satisfying a property P, the VC can control the vehicle satisfying the measure of performance M.

Some embodiments are based on recognition that such a mutual dependency is complicated by the necessity to use different motion models for generating the desired trajectory and for controlling the vehicle according the desired trajectory. For example, in order to generate the desired trajectory a longer future horizon needs to be considered. Having a complicated physical model to compute the motion of the vehicle over the extended future horizon is computationally difficult. Conversely, when the desired trajectory is known, the control of the vehicle according the desired trajectory can consider only the next control step or a short future horizon. In addition, the control of the vehicle needs to be more precise that trajectory generation process.

To that end, some embodiments use different motion models for generating the desired trajectory and for controlling the vehicle according the desired trajectory. For example, a first motion model used by SC for generating the desired trajectory to follow is simpler than a second motion model used by VC for controlling the vehicle. For example, an order of the second model used by VC is higher that an order of the first model used by SC. For example, the order of a model can be defined by a number of state variables in the model. Using different models simplifies the computational requirement of ADA or AD system, but complicates establishing mutual dependencies between the SC and the VC.

Some embodiments are based on realization that the mutual dependency between different models of the SC and VC can be established through constraints imposed on the models. For example, the requirement for satisfying the measure of performance M can be transformed into constraints on the state of the vehicle and/or on the second model of the vehicle used by the VC. Specifically, such constraints can specify that the current state of the vehicle satisfies the measure of performance M and that there is such a control action that changes the current state of the vehicle without violating the measure of performance M while the position along the desired trajectory also changes. In such a manner, the constraints guaranties that the motion of the vehicle always satisfies the metric of performance M. Some embodiment are based on recognition that due to the differences between the first and the second models, such constraints on the state of the vehicle are not always possible to determine. To that end, some embodiments add an additional constraint on a first motion model of the SC that can limit a number of possible desired trajectories generated by the SC, and thus can serve as the property P.

To that end, some embodiments select a first constraint on a desired trajectory of the vehicle, and select a control invariant set joining states of the first model with states of the second model. The first constraint and the control invariant set are determined such that for each combination of the states within the control invariant subset there is at least one control action to the second model that maintains the state of the second model within the control invariant set for every modification of the state of the first model satisfying the first constraint. The first constraint and the control invariant set establish a mutual dependency that if SC generates a desired trajectory satisfying the first constraint, i.e., the property P, the VC can control the vehicle maintaining the state of the vehicle within the control invariant set, i.e., satisfying the measure of performance M.

Accordingly, one embodiment of the invention discloses a method for controlling a vehicle. The method includes selecting from a memory a first model of motion of vehicle, and a second model of the motion of the vehicle, wherein an order of the second model is higher that an order of the first model, wherein the order of a model is a number of state variables in the model; selecting from the memory a first constraint on the first model for moving a vehicle along a desired trajectory of the vehicle, and selecting a control invariant set joining states of the first model with states of the second model, wherein for each combination of the states within the control invariant subset there is at least one control action to the second model that maintains the state of the second model within the control invariant set for every modification of the state of the first model satisfying the first constraint; determining using the first model a portion of the desired trajectory satisfying the first constraint; determining, using the second model, a sequence of commands for moving the vehicle along the portion of the desired trajectory, such that the sequence of commands maintain the sequence of the states of the second model and a sequence of the states of the first model determined by the portion of the desired trajectory within the control invariant subset; and controlling the vehicle using at least one command from the sequence of commands. The steps of the method are performed using a processor operatively connected to the memory.

Another embodiment discloses a controller for controlling a vehicle, including a memory to store a first model of motion of vehicle, to store a second model of the motion of the vehicle, wherein an order of the second model is higher that an order of the first model, wherein the order of a model is a number of state variables in the model, to store a first constraint on the first model for moving a vehicle along a desired trajectory of the vehicle, and to store a control invariant set joining states of the first model with states of the second model, wherein for each combination of the states within the control invariant subset there is at least one control action to the second model that maintains the state of the second model within the control invariant set for every modification of the state of the first model satisfying the first constraint; a supervisory controller to determine using the first model a portion of the desired trajectory satisfying the first constraint; a vehicle controller to determine, using the second model, a sequence of commands for moving the vehicle along the portion of the desired trajectory, such that the sequence of commands maintain the sequence of the states of the second model and a sequence of the states of the first model determined by the portion of the desired trajectory within the control invariant subset; and an actuator controller to control the vehicle using at least one command from the sequence of commands.

Yet another embodiment discloses a non-transitory computer readable memory embodied thereon a program executable by a processor for performing a method, which includes selecting from the memory a first model of motion of vehicle, and a second model of the motion of the vehicle, wherein an order of the second model is higher that an order of the first model, wherein the order of a model is a number of state variables in the model; selecting from the memory a first constraint on the first model for moving a vehicle along a desired trajectory of the vehicle, and selecting a control invariant set joining states of the first model with states of the second model, wherein for each combination of the states within the control invariant subset there is at least one control action to the second model that maintains the state of the second model within the control invariant set for every modification of the state of the first model satisfying the first constraint; determining using the first model a portion of the desired trajectory satisfying the first constraint; determining, using the second model, a sequence of commands for moving the vehicle along the portion of the desired trajectory, such that the sequence of commands maintain the sequence of the states of the second model and a sequence of the states of the first model determined by the portion of the desired trajectory within the control invariant subset; and controlling the vehicle using at least one command from the sequence of commands.

DETAILED DESCRIPTION

Figure 1:
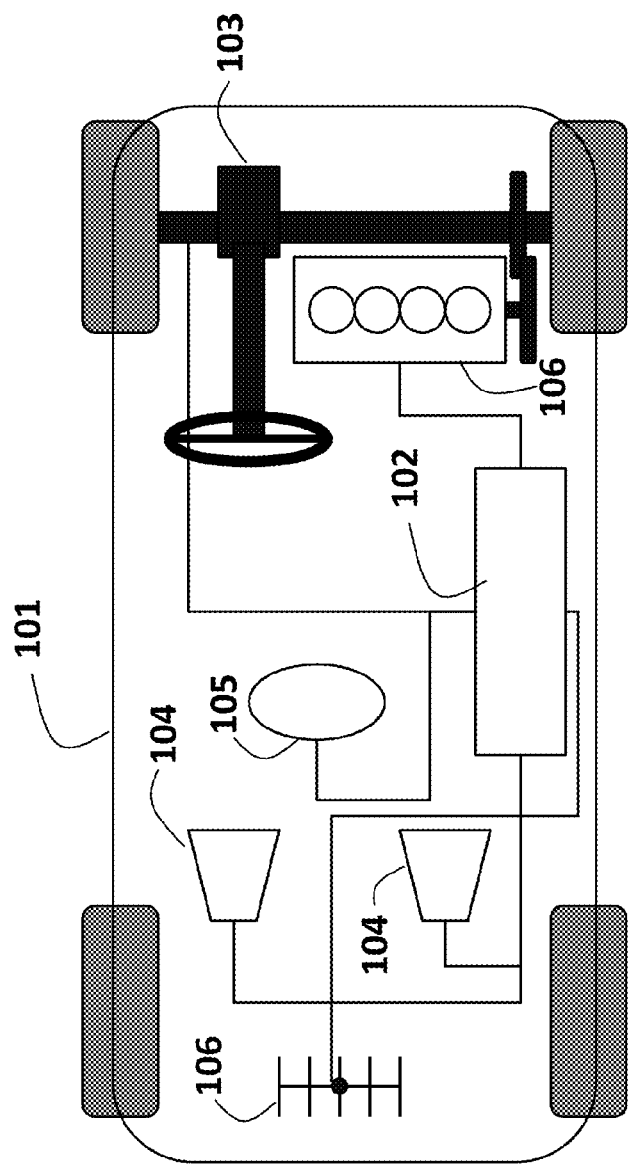
FIG. 1 is a schematic of a vehicle including a controller employing principles of some embodiments of the invention.

FIG. 1 shows a schematic of a vehicle 101 including a controller 102 employing principles of some embodiments of the invention. As used herein, the vehicle 101 can be any type of wheeled vehicle, such as a passenger car, bus, or rover. Also, the vehicle 101 can be an autonomous or semi-autonomous vehicle. For example, some embodiments control the motion of the vehicle 101. Examples of the motion include lateral motion of the vehicle controlled by a steering system 103 of the vehicle 101. In one embodiment, the steering system 103 is controlled by the controller 102. Additionally or alternatively, the steering system 103 can be controlled by a driver of the vehicle 101.

The vehicle can also include an engine 106, which can be controlled by the controller 102 or by other components of the vehicle 101. The vehicle can also include one or more sensors 104 to sense the surrounding environment. Examples of the sensors 104 include distance range finders, radars, lidars, and cameras. The vehicle 101 can also include one or more sensors 105 to sense its current motion quantities and internal status. Examples of the sensors 105 include global positioning system (GPS), accelerometers, inertial measurement units, gyroscopes, shaft rotational sensors, torque sensors, deflection sensors, pressure sensor, and flow sensors. The sensors provide information to the controller 102. The vehicle can be equipped with a transceiver 106 enabling communication capabilities of the controller 102 through wired or wireless communication channels.

Figure 2:
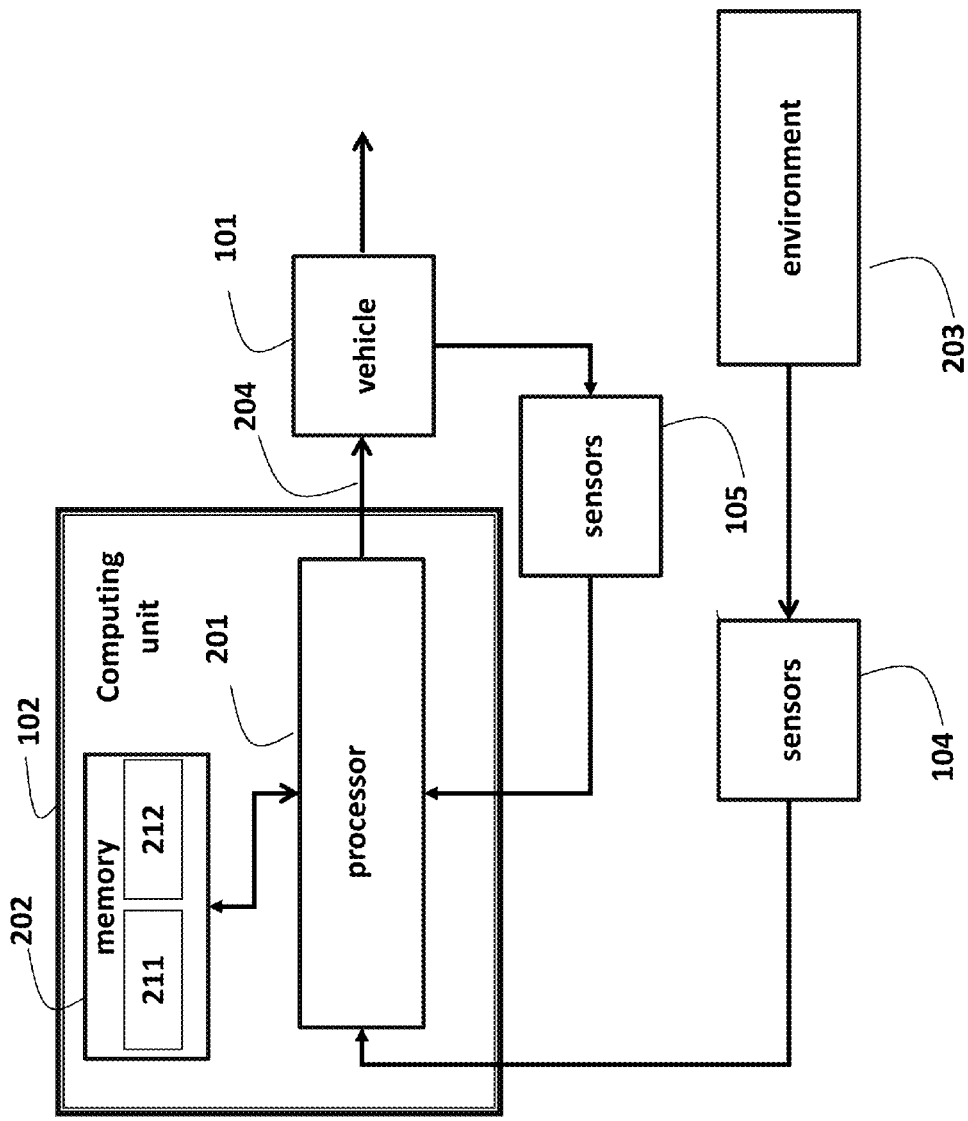
FIG. 2 is a block diagram of the controller of FIG. 1 according to one embodiment of the invention.

FIG. 2 shows a block diagram of the controller 102 according to one embodiment of the invention. The controller 102 includes a processor 201 connected to a memory 202, e.g., a non-transitory computer readable medium. In some implementations, the memory 202 includes a first section 211 for storing information about the vehicle and a second section 212 for storing a program for controlling the vehicle. For example, the first section 211 of the memory 202 can store a first model of motion of vehicle and a second model of the motion of the vehicle. In various embodiments, an order of the second model, e.g., a number of state variables in the model, is higher that an order of the first model. Those embodiments are based on recognition of the necessity to use different motion models for generating the desired trajectory and for controlling the vehicle according the desired trajectory. For example, in order to generate the desired trajectory a long future horizon needs to be considered. Having a complicated physical model to compute the motion of the vehicle over the extended future horizon is computationally difficult. Conversely, when the desired trajectory is known, the control of the vehicle according the desired trajectory can consider only the next control step or a short future horizon. In addition, the control of the vehicle needs to be more precise that trajectory generation process. To that end, in some embodiment, the controller 102 generates the trajectory using the first, i.e., simplified, motion model, while control the vehicle according the trajectory using the second, more complicated, motion model.

The second section 212 of the memory 202 can have embodied thereon a program executable by the processor 201 for performing a method for controlling the vehicle 101. The processor 201 can be any computational device capable of performing computations, and can include one or many physical devices of the same or of different types. Additionally or alternatively, the processor 201 can include multiple computational devices, e.g., microprocessors. Similarly the memory 202 can be any logical memory and/or non-transitory computer readable storage medium capable of storing information, and can include one or more physical information storage means, of the same or of different types. The computations performed by the processor 201 are commanded by the program stored in the second section of the memory 212, and use the vehicle information stored in the first section of the memory, 211, the information about the vehicle 101 obtained from the sensors 105, the information of the environment 203 obtained from the sensors 104. The computation of the processor 201 result in commands 204 that change the motion of the vehicle.

The program executed by the processor 201 enables certain functionalities of the vehicle 101. For instance, the operation of the processor 210 can enable specific advanced driving assistance (ADA) features, such as lane keeping or collision avoidance, or can enable autonomous driving (AD) of the vehicle 101. During any of these operations, the program executed in by the processor 201 aims at achieving specific objectives of driving, such as staying in the lane, avoiding an obstacle, reaching a specific location. The objectives are achieved by appropriately influencing the motion of the vehicle 101. The software program executed by the processor 201 can be logically separated into multiple modules. For example, in one embodiment, the program executed by the processor includes at least two modules arranged in a sequence as layers such that output of one layer is an input to a next layer. As used herein, such layering specifies layers or logical controllers of the controller 102, and allows separating the control into different stages requiring different information.

Figure 3:
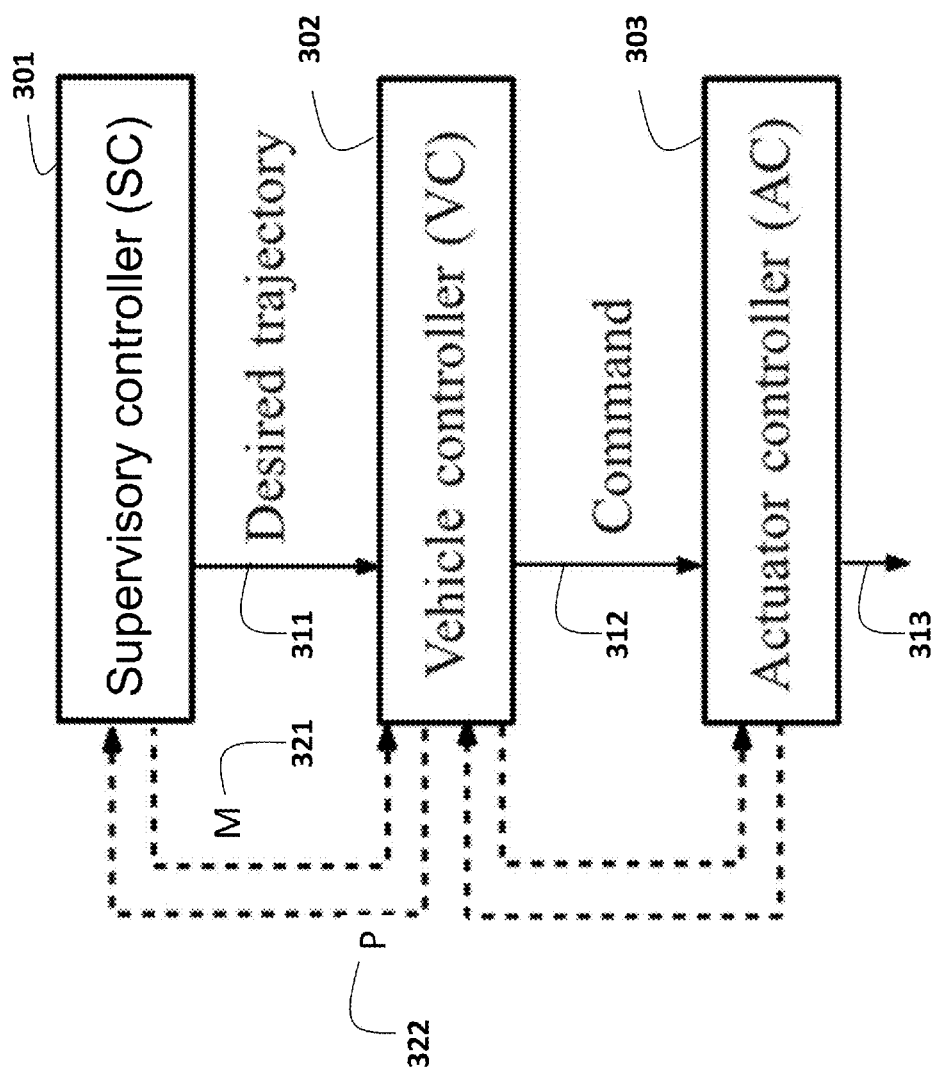
FIG. 3 is a schematic of the layers of the controller according to one embodiment of the invention.

FIG. 3 shows a schematic of the layers of the controller 102 according to one embodiment of the invention. In this embodiment, the controller 102 includes three layers of the control. The objective of the motion of the vehicle is represented as a path or a desired trajectory 311 that the vehicle needs to follow according to the objective of the motion. The desired trajectory is generated by a supervisory controller (SC) 301. Examples of the methods used by SC to generate the desired trajectory include various decision making and path planning techniques. The desired trajectory generated by SC is provided to a vehicle controller (VC) 302 that aims at computing commands 312 for the actuation system, such as the steering system 103 or the engine for influencing the motion of the vehicle to follow the trajectory 311. The VC commands 312 are received by the actuator controller (AC) 303, for instance in the electric power steering module, and actuated by the appropriate electromechanical devices, resulting in actions 313 that change the motion of the vehicle, in a way that makes the vehicle follow the trajectory.

The division of the program providing ADA and AD into multiple logical controllers or layers can be advantageous because of computational and information requirements of the control. Each layer needs to access different information at different rates, and is requested to produce results of different complexity at different rates. However, having multiple layers complicates the achievement of the overall objective, because the different logical controllers need to be properly coordinated. For instance each higher layer needs to account for the behavior of the lower layer in producing its computations.

Some embodiments are based on recognition that the motion of the vehicle tracking the trajectory needs to satisfy a measure of performance (M) that depends on the current objective of the motion. For example, the vehicle does not have to follow the desired trajectory exactly, but the maximum difference between the actual trajectory of the vehicle and the desired trajectory needs to be less than a threshold, say 50 cm. Some embodiments are based on recognition that such a measure of performance, i.e., in this example the maximal difference of 50 cm, can result from the actual practicalities in controlling the vehicle, but also can be accounted while generating the desired trajectory for the objective of the motion. For example, if the objective of the motion is lane keeping, all possible desired trajectories need to have a safety margin from the border of the lane equal or greater to the threshold, e.g., said 50 cm. Similarly, if the objective of the motion is the collision avoidance, all possible desired trajectories need to keep a safety distance margin from an obstacle, equal or greater than the threshold, e.g., said 50 cm.

Thus, the measure of performance M that needs to be achieved while controlling the vehicle along the desired trajectory is connected to the type of desired trajectory allowed to be generated. To that end, the generation of the desired trajectory and the vehicle control according to the desired trajectory are not just sequential, but mutually dependent processes. For example, if the desired trajectory is generated by the SC 301, and the motion of the vehicle along the desired trajectory is controlled by the VC 302, the cooperation between the SC and VC can include a mutual dependency that if SC generates a desired trajectory satisfying a property P 322, the VC can control the vehicle satisfying the measure of performance M 321. In other words, for being possible to guarantee M 321, the SC restricts the trajectories to belong to a specific class P 322.

To that end, one embodiment of the invention, given the measure of performance M 321, determines the class of the trajectories P 322 that the SC 301 can generate, constructs the VC 302 that guarantees M for any trajectory in P, restricts the SC to generate only trajectories in P, and operates the VC to ensure that M is satisfied, throughout the entire operation of the vehicle. In another embodiment of the invention, the coordination is also enabled between the VC and the AC.

Figure 4A:
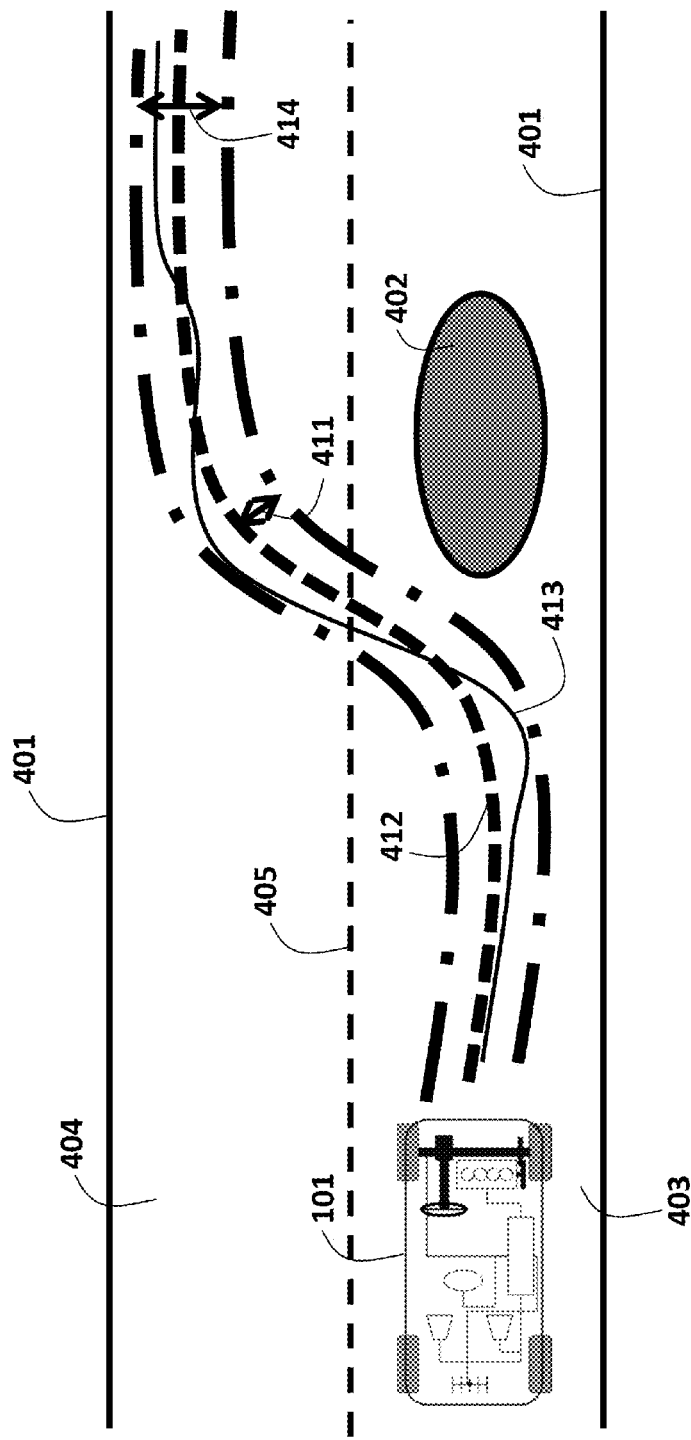
FIG. 4A and FIG. 4B are illustrations of different principles of the vehicle control according to some embodiments of the invention.
Figure 4B:
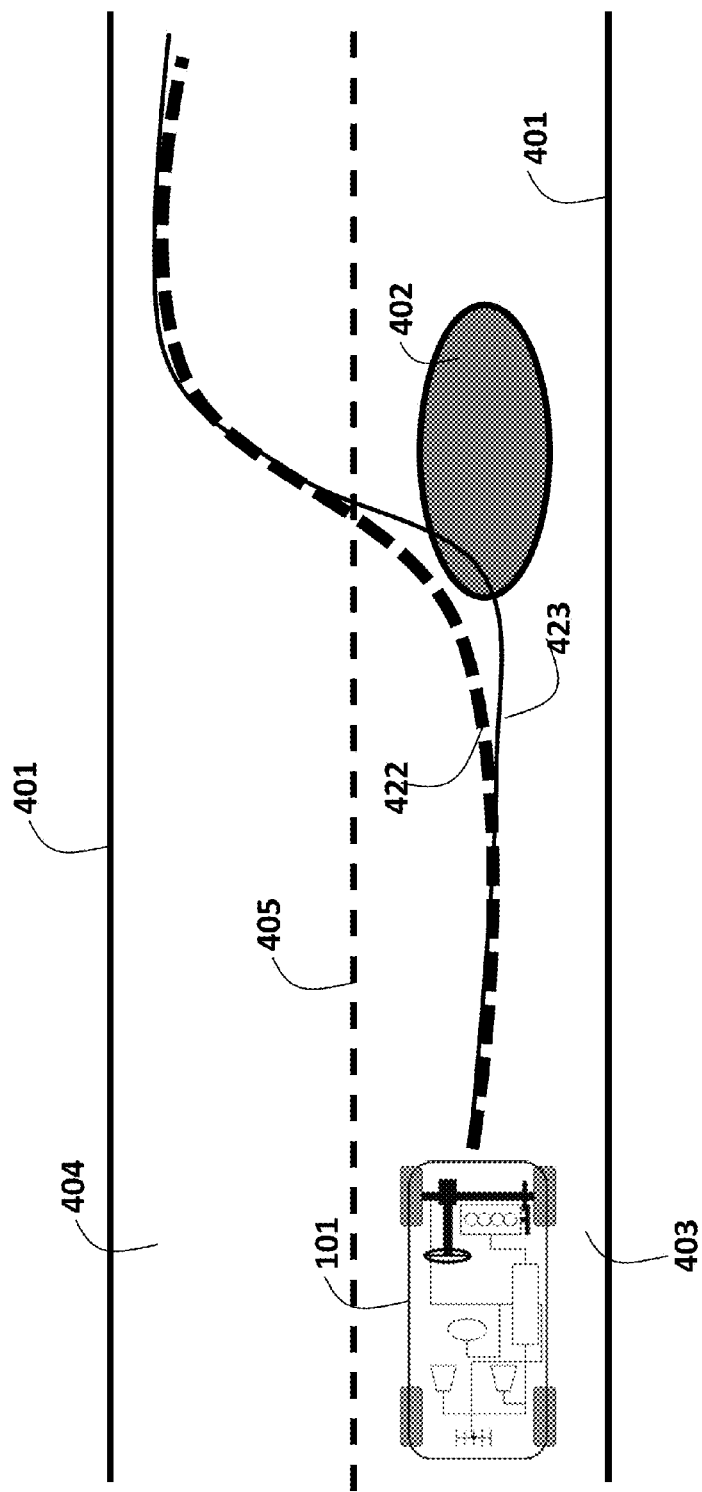

FIG. 4A and FIG. 4B show an illustration of principle of the vehicle control according to some embodiments of the invention. Those examples are related to an ADA function operating collision avoidance by steering. In a road with boundaries 401 and lane separation 405, as shown in FIG. 4A, an obstacle 402 in the current lane of travel 403 requires the vehicle to move to the other lane 404. The measure of performance M is a given bound 411 on the maximum difference between the trajectory generated by the SC 412 and the vehicle motion 413 obtained by the applying the commands of the VC. If the VC guarantees M, then the SC knows that the actual vehicle motion will be in an area of width 414 around the SC trajectory. Hence, by ensuring a minimal separation of M 414 from the obstacle, the SC achieves guarantees of no collision. In contrast, as shown in FIG. 4B, if the SC does not account that the VC is controlling a vehicle, and that the actual vehicle motion is different from the SC trajectory, the SC may generate a trajectory 422 which does not collide, but the actual vehicle motion 423 ends up colliding due to the difference between the ideal motion considered in the SC and the actual vehicle motion.

Some embodiments are based on recognition that such a mutual dependency is complicated by the necessity to use different motion models for generating the desired trajectory and for controlling the vehicle according the desired trajectory. For example, in order to generate the desired trajectory a long future horizon needs to be considered. Having a complicated physical model to compute the motion of the vehicle over the extended future horizon is computationally difficult. Conversely, when the desired trajectory is known, the control of the vehicle according the desired trajectory can consider only the next control step or a short future horizon. In addition, the control of the vehicle needs to be more precise that trajectory generation process.

To that end, some embodiments use different motion models for generating the desired trajectory and for controlling the vehicle according the desired trajectory. For example, a first motion model used by SC for generating is simpler than a second motion model used by VC for controlling the vehicle, i.e., an order of the second model used by VC is higher that an order of the first model used by SC. As used herein, the order of a model is a number of state variables in the model. Using different models simplifies the computational requirement of the vehicle control, but complicates establishing mutual dependencies between the SC and the VC.

Some embodiments are based on realization that the mutual dependency between different models of the SC and VC can be established through different constraints imposed on the models. For example, the requirement for satisfying the measure of performance M can be transformed into constraints on the state of the vehicle and/or on the second model of the vehicle used by the VC. Specifically, such constraints can specify that the current state of the vehicle satisfies the measure of performance M and that there is such a control action that changes the current state of the vehicle without violating the measure of performance M. In such a manner, the constraints guaranties that the motion of the vehicle always satisfies the metric of performance M. Some embodiment are based on recognition that due to the differences between the first and the second models, such constraints on the state of the vehicle are not always possible to determine. Hence, some embodiments add an additional constraint on a first motion model of the SC that can limit a number of possible desired trajectories generated by the SC, and thus can serve as the property P.

For example, some embodiments select a first constraint on the first model moving on a desired trajectory of the vehicle, and select a control invariant set joining states of the first model with states of the second model. The first constraint and the control invariant set are determined such that for each combination of the states within the control invariant subset there is at least one control action to the second model that maintains the state of the second model within the control invariant set for every modification of the state of the first model satisfying the first constraint. The first constraint and the control invariant set establish a mutual dependency that if SC generates a desired trajectory such that the first model moving on the desired trajectory satisfies the first constraint, i.e., the property P, the VC can control the vehicle maintaining the state of the vehicle within the control invariant set, i.e., satisfying the measure of performance M.

Figure 5A:
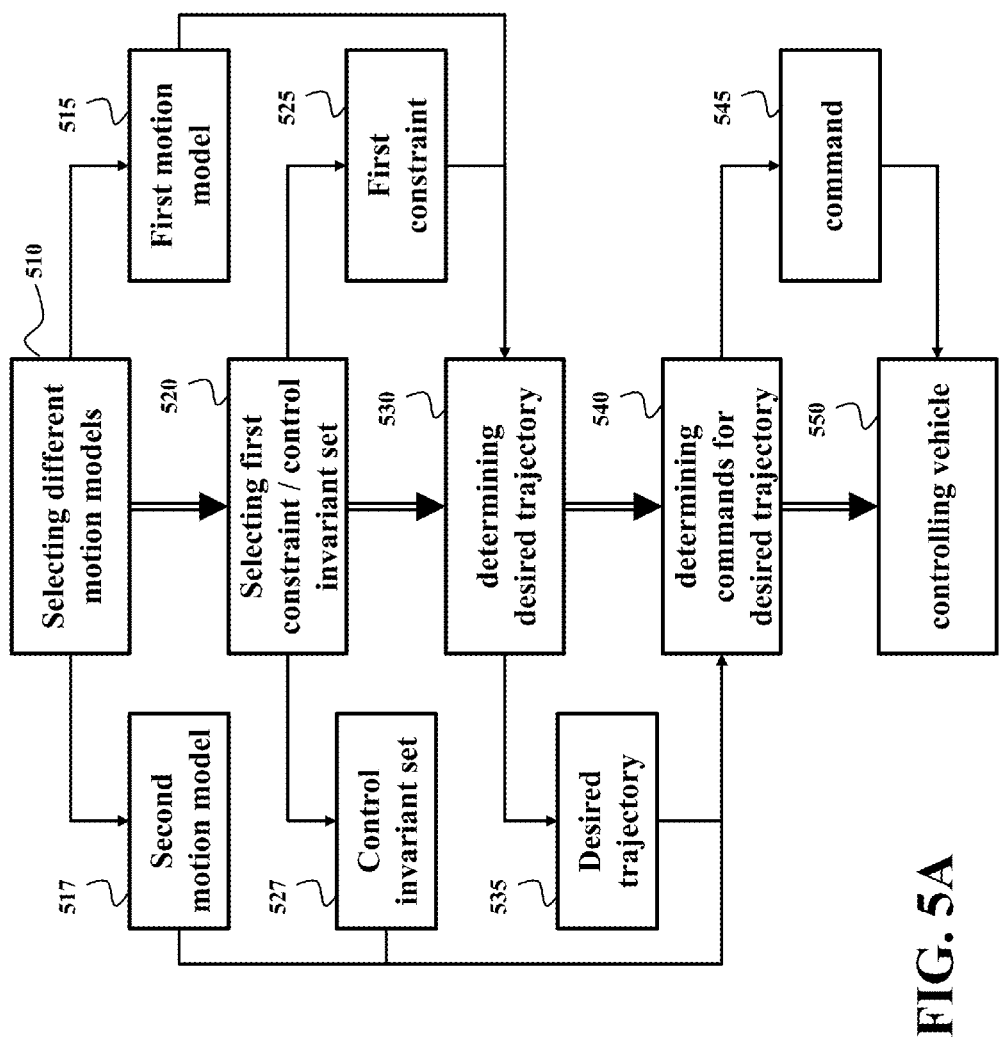
FIG. 5A is a block diagram of a method for controlling a vehicle according to one embodiment of the invention.

FIG. 5A shows a block diagram of a method for controlling a vehicle 101 according to one embodiment of the invention. The method can be executed by a processor, such as the processor 201. Additionally or alternatively, the method can be stored on a non-transitory computer readable storage medium as a program embodied thereon, such that a program executable by a processor performs the method.

The method selects 510 from a memory, e.g., the memory 202, a first model 515 of motion of vehicle and a second model 517 of the motion of the vehicle. Usually the first model is simpler than the second model. For example, an order of the second model 517 is higher that an order of the first model 515. As used herein the order of a model is a number of state variables in the model. The first model is used to represent the motion of the vehicle moving along, e.g., exactly on, the desired trajectory, vehicle the second model of the motion of the vehicle is used to represent the motion of the vehicle under the action of the VC. The method also selects 520 from the memory a first constraint 525 on the first model of the motion of the vehicle moving on the desired trajectory, and a control invariant set 527 joining states of the first model with states of the second model. The control invariant set 527 is determined such that for each combination of the states within the control invariant set there is at least one control action to the second model that maintains the state of the second model within the control invariant set for every modification of the state of the first model satisfying the first constraint 525.

For example, the states of the first model may include position of the vehicle at any point in time and the yaw rate of the vehicle while moving exactly along the desired trajectory. The values of the state variable of the first model can vary within bounds given by the first constraint. The first constraint may or may not limit one of the state variables of the first model. For example, in one embodiment, the first constraint determines transitions between the states of the first model. Examples of the first constraint include a constraint on a change of a curvature of the motion along the desired trajectory, and a constraint on a change of a yaw rate of transitioning the first model along the desired trajectory. The state variables of the second model include the lateral displacement from the desired trajectory, the lateral velocity, the orientation error with respect to the trajectory, and the yaw rate while moving according to the actions of the VC. The state variables of the first and the second model can be the same or different. The state variables can be selected according to the metric of performance of the vehicle. For example, the performance of the vehicle can be one or combination of reducing lateral acceleration of the vehicle, reducing yaw rate of the vehicle, reducing lateral displacement from the desired trajectory, and reducing steering wheel actuation power.

The state variables of the control invariant set include the states of the first and second model. Because the states of the control invariant set includes relationship, e.g., bounds on an error between the motion of the first model along the trajectory and the state of the vehicle determined by the second model moving as controlled by the VC, the control invariant set joins states of the first model with states of the second model according to this relationship. The values of the control invariant set can be determined in advance, e.g., based on the objective of the motion and the metric of performance M. By its construction, the control invariant set guaranties that while the corresponding state of the second model of the vehicle and of the first model of the motion of the vehicle are within the control invariant set, the metric of performance M is satisfied.

Some embodiments appreciate that designing such a control invariant set for all possible trajectories generated by the simplified first motion model may not always be possible. To that end, the first constraint limits the variations of the desired trajectory according to the first model of the motion of the vehicle moving along such desired trajectory to enable the generation of such a control invariant set. For example, one embodiment selects the largest value of the first constraint allowing non-empty control invariant set. Additionally or alternatively, one embodiment reduces the value of the first constraint while increasing the size of the control invariant set. To that end, the first constraint can be considered as a balancing factor between a number of possible variations of the desired trajectory and the size of the control invariant set, that determines the number of allowed actions by the VC.

Next, the method determines 530 using the first model 515 a portion of the desired trajectory 535 satisfying the first constraint 525 and determines 540, using the second model 517, a sequence of commands 545 for moving the vehicle along the portion of the desired trajectory 535, such that the sequence of commands maintain the sequence of the states of the second model 517 and a sequence of the states of the first model 515 determined by the portion of the desired trajectory within the control invariant subset 527. The method controls 550 the vehicle 101 using at least one command 545 from the sequence of commands.

For example, for the desired trajectories satisfying the property P, one can determine allowed combination of trajectory conditions and current vehicle conditions, which results in a region of conditions R, i.e., the control invariant set 527, that the vehicle future conditions and the current trajectory needs to satisfy. Because the vehicle future conditions depend on the current vehicle conditions and the vehicle commands applied to the vehicle, the conditions R also determine the valid commands for the vehicle.

Figure 5B:
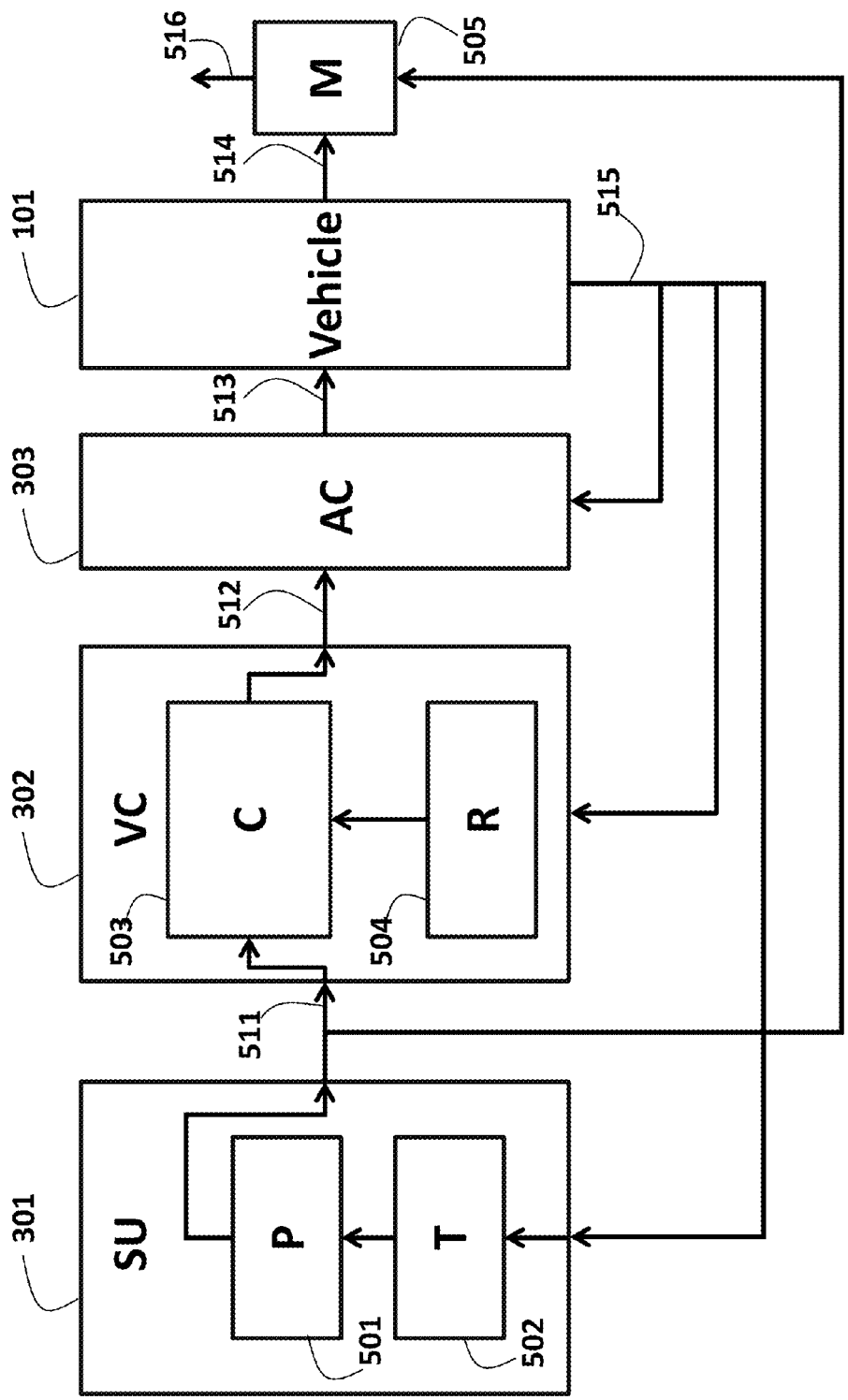
FIG. 5B is a schematic of cooperative control according to one embodiment of the invention.

FIG. 5B shows a schematic of cooperative control according to one embodiment of the invention. In the SC 301, the initially generated desired trajectory provided by, e.g., a path planner module T 502, based on current vehicle information 515, is modified 501 to belong to the class of trajectories satisfying the property P, and the modified trajectory 511 is provided to the VC 302. In the VC a controller C 503 uses the vehicle information 515, the modified trajectory 511, and a region R 504 of allowed combinations of trajectory conditions and current vehicle conditions that determine the vehicle commands 512, which is provided to the AC 303. The AC using the current vehicle information 515 and the vehicle command 512 generates physical actions 513 for the vehicle 101, that modify the motion of the vehicle 514, such that the measure of performance M 505 always returns true 516, i.e., it is satisfied, by the motion of the vehicle 514 for the modified trajectory 512.

Exemplar First Motion Models

In some embodiments, the SC generates timed trajectories that describe the desired position of the vehicle at certain time instants. For instance the timed trajectories may contain information of the sequence of position vectors $(p_x, p_y)$ of the vehicle at specific time instants. However, the information on such trajectory needs to be augmented with additional information on the motion of the vehicle that follows such trajectory. Thus, the SC generates additional information on the motion of the vehicle on the desired trajectory based on a first model of the motion of the vehicle moving exactly on said trajectory. For instance, according to the SC trajectory, the first model of the motion of the vehicle determines not only the desired position $(p_x, p_y)$ of the vehicle, but also the orientation $\theta$ and the yaw rate $\omega$, and the longitudinal velocity $v$ at time $t$ as related by $$\dot{p}_x(t) = v(t)\cos\theta(t) \qquad (1)$$
$$\dot{p}_x(t) = v(t)\cos\theta(t)$$
$$\dot{\theta}(t) = \omega(t) = \frac{v(t)}{r(t)} = v(t)\kappa(t)$$

where $r$ is the turning radius, $\kappa$ is the curvature of the path. Thus, given a current position and orientation, and a longitudinal velocity the yaw rate determines the future position. The yaw rate can be defined by $$\omega(t) = f_\omega(x_r, \dot{x}_r, u_r) \qquad (2)$$

where $x_r$ and $u_r$ are the internal state variable and the input of a system generating the trajectory. The internal state determines the current condition of the first model moving exactly on the SC trajectory. The input determines the forced change of the first model condition to continue moving exactly on the SC trajectory.

Examples of the motion models satisfying the Equation (2) include $$\dot{x}_r = \overline{A}_r x_r + \overline{B}_r u_r$$

$$\omega = C_r x_r \qquad (3)$$

or the even simpler form $$\dot{\omega} = u_r, \qquad (4)$$

which corresponds to the motion of an ideal vehicle represented as a particle moving exactly on the SC trajectory.

In general the differential equations in (3), (4) can be converted to difference equations, where the solution is defined at discrete-time instants indexed by k and separated by time intervals of equal length $T_s$, since this form is more amenable for determination in a microprocessor, resulting in $$x_r(k+1) = A_r x_r(k) + B_r u_r(k)$$

$$y_r(k) = \omega(k) = C_r x_r(k) \qquad (5)$$

and $$y_r(k) = x_r(k) = \omega(k) = x_r(k) + T_s u_r(k), \qquad (6)$$

respectively.

Because the motions that a vehicle can execute are limited by the mechanical and safety considerations, the trajectories generated by the SC can be limited also. In particular the limitations of the SC trajectories can be defined by ensuring that the first model, e.g., (5), (6) satisfies constraints $$x_r \in X_r, u_r \in U_r \qquad (7)$$

where $X_r$ and $U_r$ are appropriate sets determining the allowed values for the state and input of the first model moving on the SC trajectory, and which can model, for instance, limits on the yaw rate and yaw acceleration $$\omega_{r_{min}} \leq \omega_r \leq \omega_{r_{max}} \qquad (8a)$$

$$\dot{\omega}_{r_{min}} \leq \dot{\omega}_r \leq \dot{\omega}_{r_{max}} \qquad (8b)$$

Exemplar Second Motion Models

Figure 6:
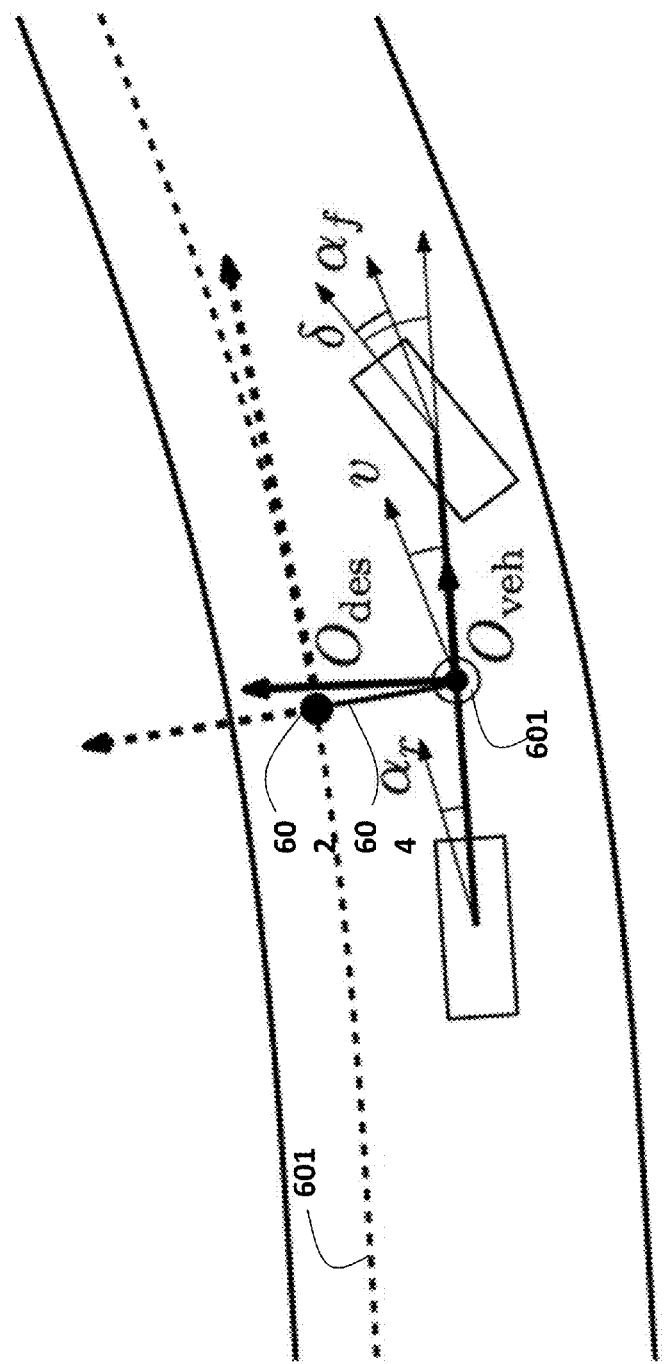
FIG. 6 is a schematic representing a relationship between the desired trajectory and a second model of the motion of the vehicle according to one embodiment of this invention.

FIG. 6 shows a schematic representing a relationship between the desired trajectory and a second model of the motion of the vehicle according to one embodiment of this invention. The desired trajectory can be represented by a reference frame 602 with x-axis along the trajectory and y-axis orthogonal to the trajectory, moving at a given speed along the path 601 according to the first model of the motion of the vehicle. In this case, the second model of the motion of the vehicle controlled by the VC can be represented as the difference between the frame 603 attached to the vehicle center of mass with x-axis along the vehicle length and y-axis along the vehicle width, and frame 602. In particular if the vehicle and the reference frame 602 move at the same speed, the difference between frame 602 and frame 603 amounts to the difference 604 of component along the y-axis of 602 and the difference between the orientation angles of the frames 603, 602. Indeed, whenever the difference 604 is zero, the vehicle moves along the desired trajectory.

Thus, the motion of the vehicle represented as a difference from the desired trajectory is written as $$\frac{d}{dt}\begin{bmatrix} e_1 \\ \dot{e}_1 \\ e_2 \\ \dot{e}_2 \end{bmatrix} = \begin{bmatrix} 0 & 1 & 0 & 0 \\ 0 & -\frac{C_f + C_r}{mv} & \frac{C_f + C_r}{m} & -\frac{C_f l_f - C_r l_r}{mv} \\ 0 & 0 & 0 & 1 \\ 0 & -\frac{C_f - C_r}{I_z v} & \frac{C_f - C_r}{I_z} & -\frac{C_f l_f^2 + C_r l_r^2}{I_z v} \end{bmatrix} \begin{bmatrix} e_1 \\ \dot{e}_1 \\ e_2 \\ \dot{e}_2 \end{bmatrix} + \qquad (9)$$

$$\begin{bmatrix} 0 \\ \frac{C_f}{m} \\ 0 \\ \frac{C_f l_f}{I_z} \end{bmatrix} \delta + \begin{bmatrix} 0 \\ -\frac{C_f l_f - C_r l_r}{mv} - v \\ 0 \\ -\frac{C_f l_f^2 + C_r l_r^2}{I_z v} \end{bmatrix} \omega$$

where $e_1$, $e_2$ are the errors in lateral distance 604, and orientations between 603, 602, $\delta$ is the steering angle and m, $I_z$ are the vehicle mass and inertia along the vertical axis, $C_f$, $C_r$ are the front and rear tire stiffnesses and $l_f$, $l_r$ are the distances of front and rear axles from the center of mass. Note that the vehicle state change depends on the trajectory yaw rate, since the trajectory yaw rate makes the reference frame 602 move, which changes the difference between the reference frame 602 and the vehicle frame 603.

The vehicle is also subjected to mechanical and safety limitations that can be modeled as constraints on the variables of the vehicle motion. The vehicle motion can be represented at discrete time instants indexed by k and separated by time intervals of equal length $T_s$, and the steering increment $\Delta u$ can be defined to obtain the vehicle model $$x(k+1) = Ax(k) + B\Delta u(k) + D\omega(k) \qquad (10)$$

where $$x = \begin{bmatrix} x_e \\ u_p \end{bmatrix}, x_e = \begin{bmatrix} e_1 \\ \dot{e}_1 \\ e_2 \\ \dot{e}_2 \end{bmatrix}, u_p(k) = u_e(k-1) = \delta(k-1), \qquad (11)$$

$$\Delta u(k) = \delta(k) - \delta(k-1)$$

and x is the state of the vehicle, that is the current vehicle condition, and $\Delta u$ is the command input to the vehicle chosen by the VC.

The constraints on the vehicle are modeled as $$x \in X, \Delta u \in U \qquad (12)$$

where X, U are appropriate sets determining the allowed values for the state and input of the vehicle and that model for instance constraints on the maximum steering and yaw rate error between the vehicle and the trajectory, and the error between the vehicle and the trajectory $$\dot{e}_{2_{min}} \leq \dot{e}_2 \leq \dot{e}_{2_{max}} \qquad (13a)$$

$$\delta_{min} \leq \delta \leq \delta_{max} \qquad (13b)$$

$$e_{1_{min}} \leq \delta e_1 \leq e_{1_{max}} \qquad (13c)$$

Trajectory Property and Measure of Performance

Based on the models for the SC trajectory and the vehicle, the measure of performance M can be defined by the constraints on the vehicle (12), which include among others the maximum lateral error between the vehicle position and the SC trajectory position. The properties P that the trajectory generated by SC must satisfy are defined by the general update equation (2), for instance expressed as (5) or (6), and by the constraints (7). In some embodiments, the constraints of the property P defines the control invariant set 527

For example, one embodiment determines the control invariant set as a region R of the combined space of SC trajectory states $x_r$ and vehicle states x such that for all combination of SC trajectory states and vehicle states in R, $(x, x_r) \in R$, the constraints on the SC trajectory states and on the vehicle states are satisfied, $x \in X$, $x_r \in X_r$, and for any combination of SC trajectory states and vehicle states in R, $(x, x_r) \in R$, there exists an input $\Delta u \in U$ such that for all the SC trajectory inputs $u_r \in U_r$ such that the next SC trajectory state is in $X_r$, the next vehicle state is in X. The invention also determines a selection for $X_r$, such that the region R is non-empty. Based on the region R this invention determines a design for the VC that determines values of the steering $\delta$ such that the measure of performance M is always achieved, for every trajectory that satisfies the property P.

Control Invariant Set

In some embodiments, the control invariant set R is determined with respect to the first model of the motion of the vehicle moving along the desired trajectory (5) and the second model of the motion of the vehicle moving under the control of the VC, (10). The control invariant set is a subset of the feasible region defined by the states of the second model of the vehicle moving under the control of the VC that satisfy equation (12) and states of the first model of the vehicle moving along the desired trajectory that satisfy equations (7), where $\Delta u \in U$ is considered the control input and $u_r \in U_r$ is considered the disturbance.

Figure 7:
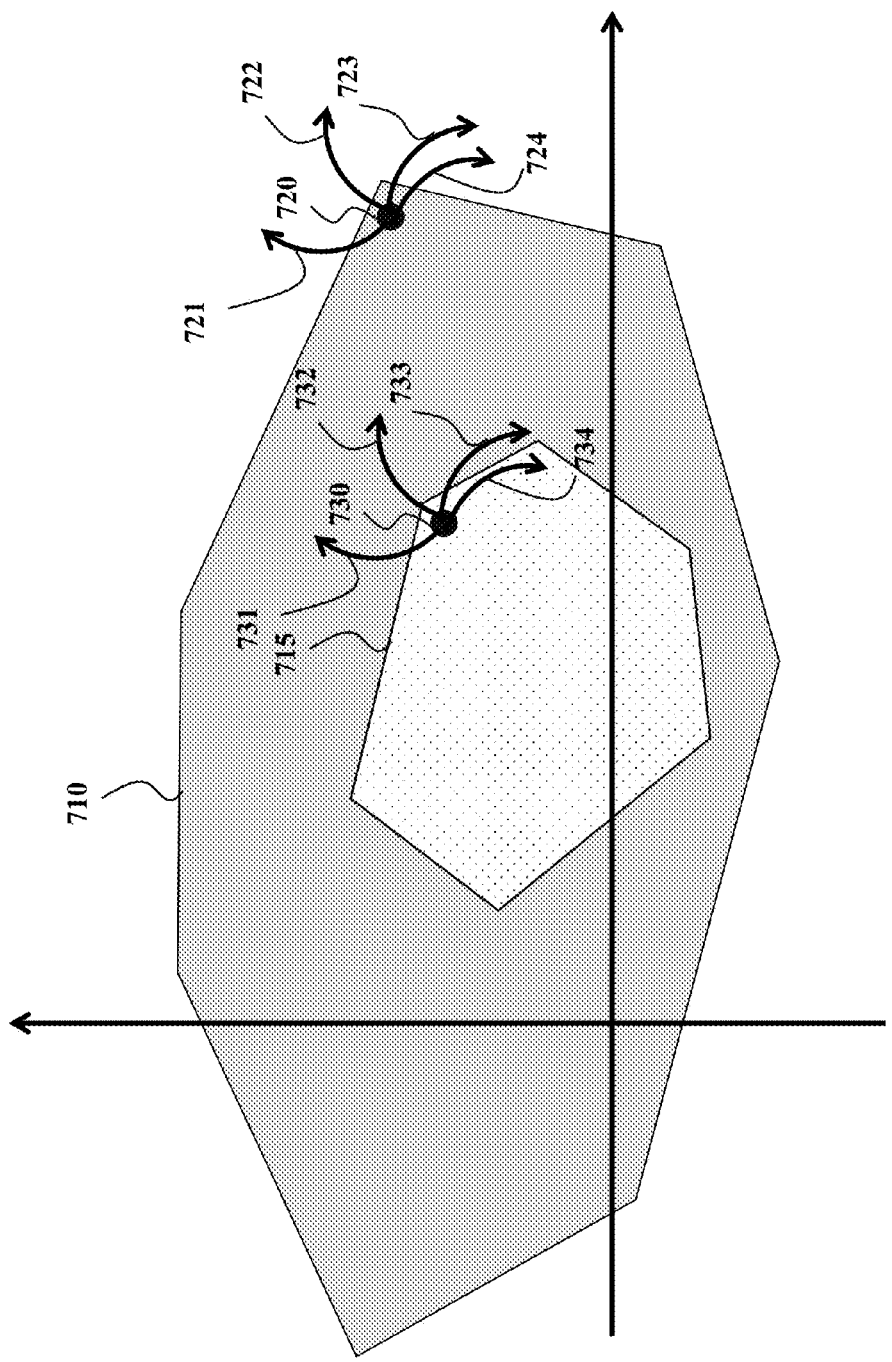
FIG. 7 is an example of a two-dimensional projection of the feasible region defined by various constraints according to embodiments of the invention.

FIG. 7 shows an example of a two-dimensional projection of the feasible region 710 defined by various constraints according to embodiments of the invention. For linear equations (5), (10), subject to linear constraints which define polyhedral sets in (7), (12), the feasible region is a multi-dimensional polytope in the space of the states of the vehicle and states of the desired trajectory determined by hyperplanes, which are represented by linear inequalities.

Because the system has dynamics, the states of first model of the motion of the vehicle and the second model of the motion of the vehicle being in the feasible region at a certain time does not by itself guarantee that they can be maintained in the feasible region at the next time, for any choice of $u_r \in U_r$. For example, the states of the second model of the motion of the vehicle and first model of the motion of the vehicle 720 can be feasible for one iteration, but all control actions 721-724 on the second model of the motion of the vehicle during the next iteration can bring a state of the second model of the motion of the vehicle outside of the feasible region 510.

Some embodiments of the invention are based on yet another realization that it is possible to select a subset 715 of the feasible region, such that from any state of the vehicle within that subset, there is a control action maintaining the state of the second model of the motion of the vehicle within the subset for all admissible future states of the first model of the motion of the vehicle. For example, for any state such as a state 730 within the subset 715 and within all possible control actions 731-734 that the controller can execute, there is at least one control action 734 that maintains the state of the second model of the motion of the vehicle and trajectory within the subset 715.

Accordingly, if a control action for controlling the operation is selected such that the states of the second model of the motion of the vehicle and the first model of the motion of the vehicle remains in that special subset 715 of the feasible region, and the feasible region is generated also according to Equations (5), (7), then there is a guarantee that the vehicle tracks the desired trajectory with the bounded error defined by the metric of performance and every future state of the vehicle always admits at least one feasible control action. In this case, the subset 715 is the control invariant set used by some embodiments of the invention. For example, the selection of the control action can be performed by optimizing a cost function representing the motion of the vehicle subject to constraints defined by that special subset 715 of the feasible region, as contrasted with the optimization within the feasible region 710 itself. As referred herein, the subset 715 is the control invariant set joining states of the first model with states of the second model.

Figure 8A:
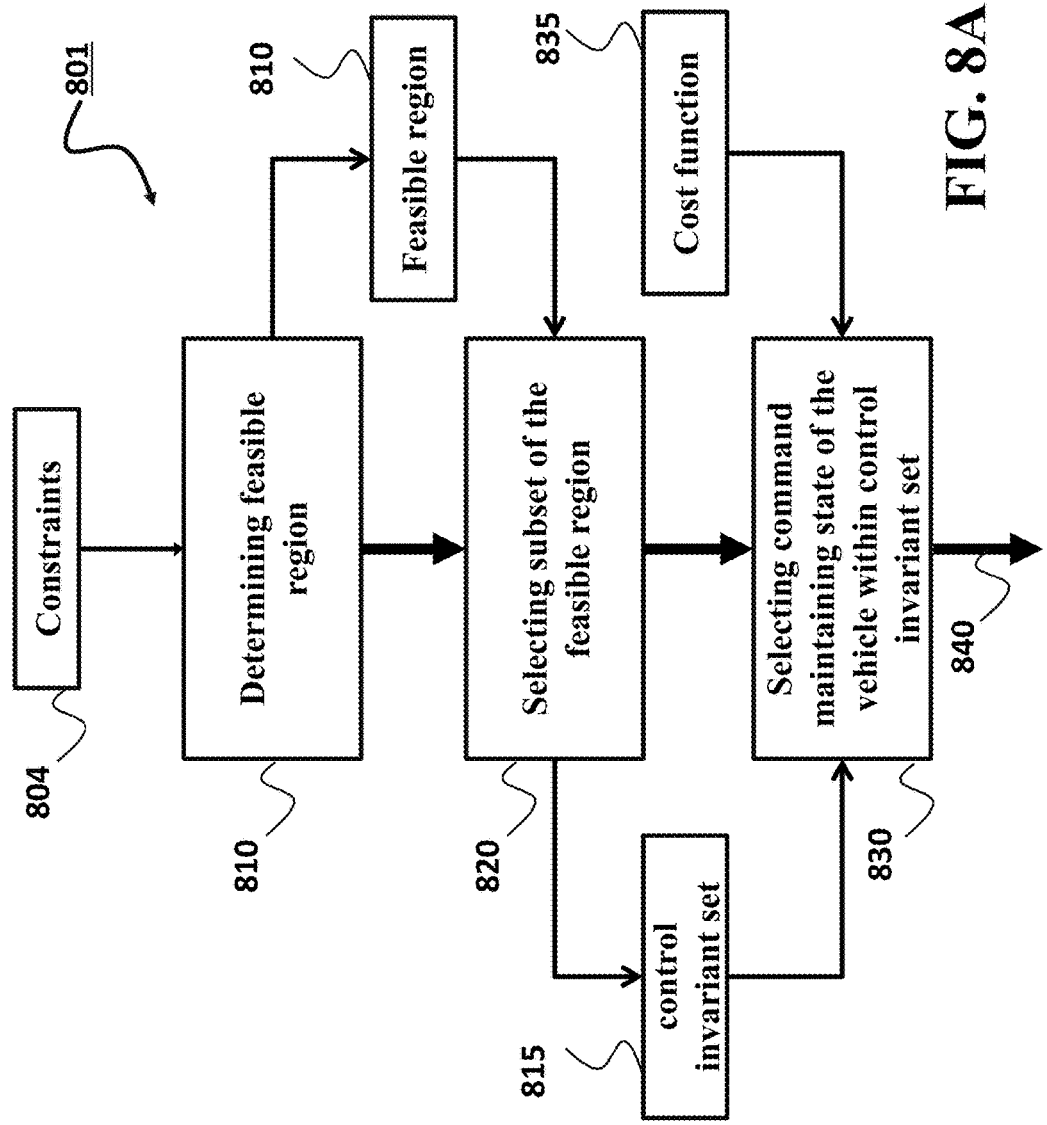
FIG. 8A is a block diagram of a method for controlling an operation of a vehicle in accordance with some embodiments of the invention.

FIG. 8A shows a block diagram of a method 801 for controlling an operation of a vehicle in accordance with some embodiments of the invention. The method can be executed by a processor 201 of the controller 102. The method determines 810 a feasible region 710 of a state of the vehicle and a state of the desired trajectory defined by constraints 804. In one implementation, the constraints 804 include constraints on the second model of the motion of the vehicle and constraints on the first model of the motion of the vehicle defined in equations (7), (12). Next, the method selects 820 the region R as a control invariant set 815 as a subset of the feasible region, such that from any state of the second model of the motion of the vehicle within the subset, there is a control maintaining the state of the second model of the motion of the vehicle within the subset for any next state of the first model of the motion of the vehicle and selects 830 a control action 840 for controlling the operation such that the state of the vehicle remains in the subset. In one embodiment, the selecting includes optimizing a cost function 835 representing the operation of the vehicle subject to constraints defined by the subset region 715. The cost function is optimized iteratively for a fixed time horizon to produce a command 840 of a current iteration.

For example, the optimization of the step 830 can be formulated as an optimization problem optimizing a performance of the vehicle subject to constraints including a combination of the future state of the second model of the motion of the vehicle and the first element from the sequence of the states of the first model belonging to the control invariant set. Examples of the performance of the vehicle include reducing lateral acceleration of the vehicle, reducing yaw rate of the vehicle, reducing lateral displacement from the desired trajectory, and reducing steering wheel actuation power. By solving the optimization problem, a command or a sequence of commands for gainfully moving the vehicle can be produced.

In some embodiments, all the steps of the method of FIG. 8A are executed during the operation of the vehicle. In alternative embodiments, the steps 810, 820 are executed before the vehicle operation, and the cost function 835 or other principles of the selection of the control action are also defined before vehicle operation. Such operations can be executed either in a microprocessor or in a general purpose computing machine, such as a desktop computer, laptop, or engineering workstation. The results of step 820 and the cost function 835 are programmed in the memory 202 of the microprocessor 201, and the step 830 is the only step that is repeatedly executed during operation of the vehicle.

Figure 8B:
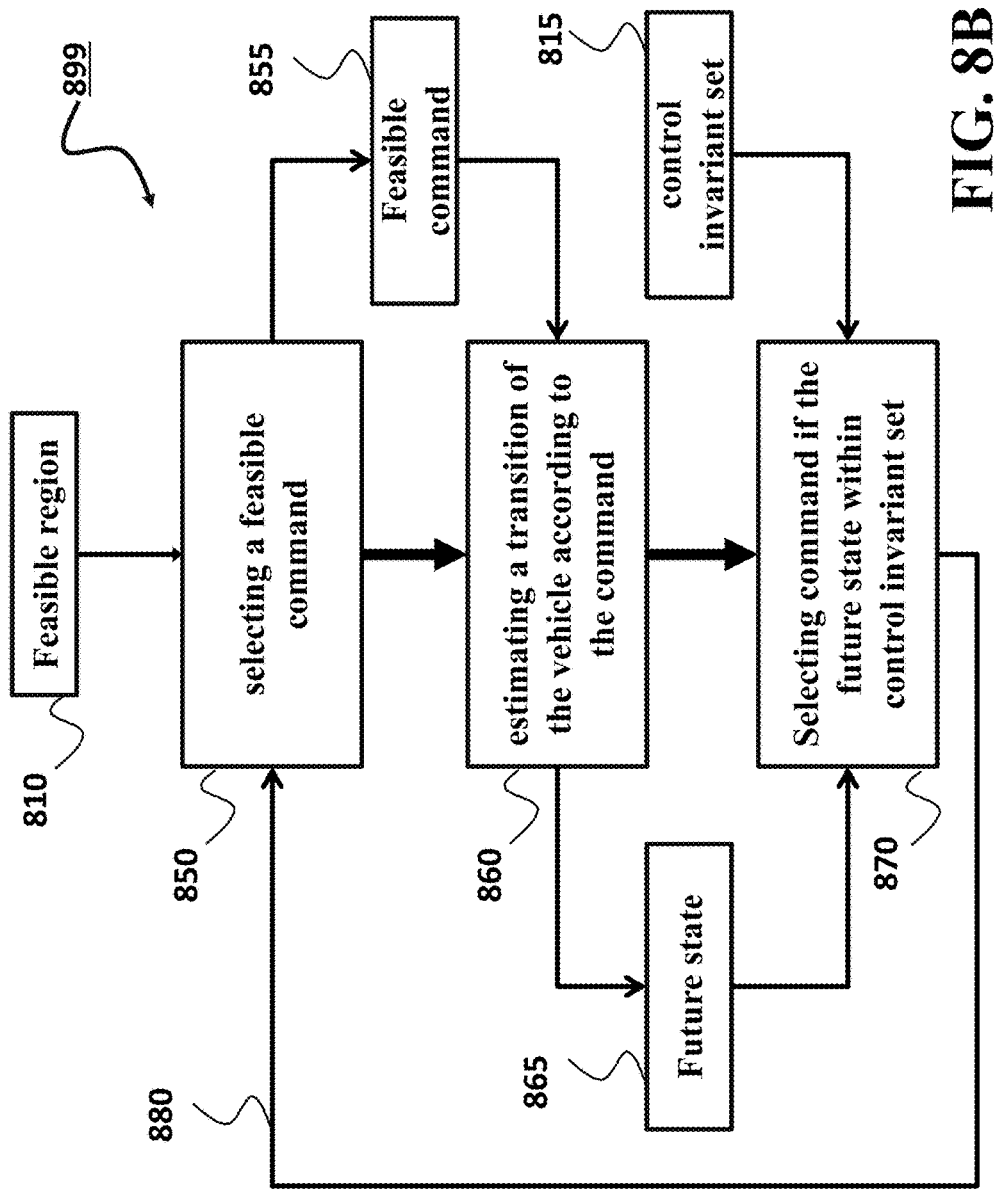
FIG. 8B is a block diagram of a method for the selection of the command to control the vehicle according to one embodiment of the invention.

FIG. 8B shows a block diagram of a method 899 for the selection 830 of the command 840 according to one embodiment of the invention. Such a method can be performed during the operation of the vehicle. The method 899 selects 850 a feasible command 855 satisfying physical constraints on the motion of the vehicle defined by the feasible region 810. The method estimates 860 a transition of the second model of the motion of the vehicle from a current state to a future state 865 according to the command and selects 870 the feasible command 855 as the command 840 for controlling the vehicle if a combination of the future state of the second model of the motion of the vehicle and the first element from the sequence of the states of the first model belongs to the control invariant set 815. Otherwise, the method selects 880 a different feasible command and repeats the estimating and the selecting steps.

For example, the feasible command 855 is a command 732 of FIG. 7. That command moves the state of the second model of the motion of the vehicle outside of the control invariant set 732. To that end, the method 899 selects 880 a different feasible command, e.g., the different feasible command can be selected to reduce a distance between the future state determined by the different feasible command and the border of the control invariant set. For example, the next different command can be the command 733. Such a command also transitions the state of the vehicle outside the control invariant set 715, so the method 899 selects another different command until such a new command maintain the state of the second model of the motion of the vehicle within the control invariant set. Example of such a command is the command 734.

Determining Control Invariant Set

Figure 9:
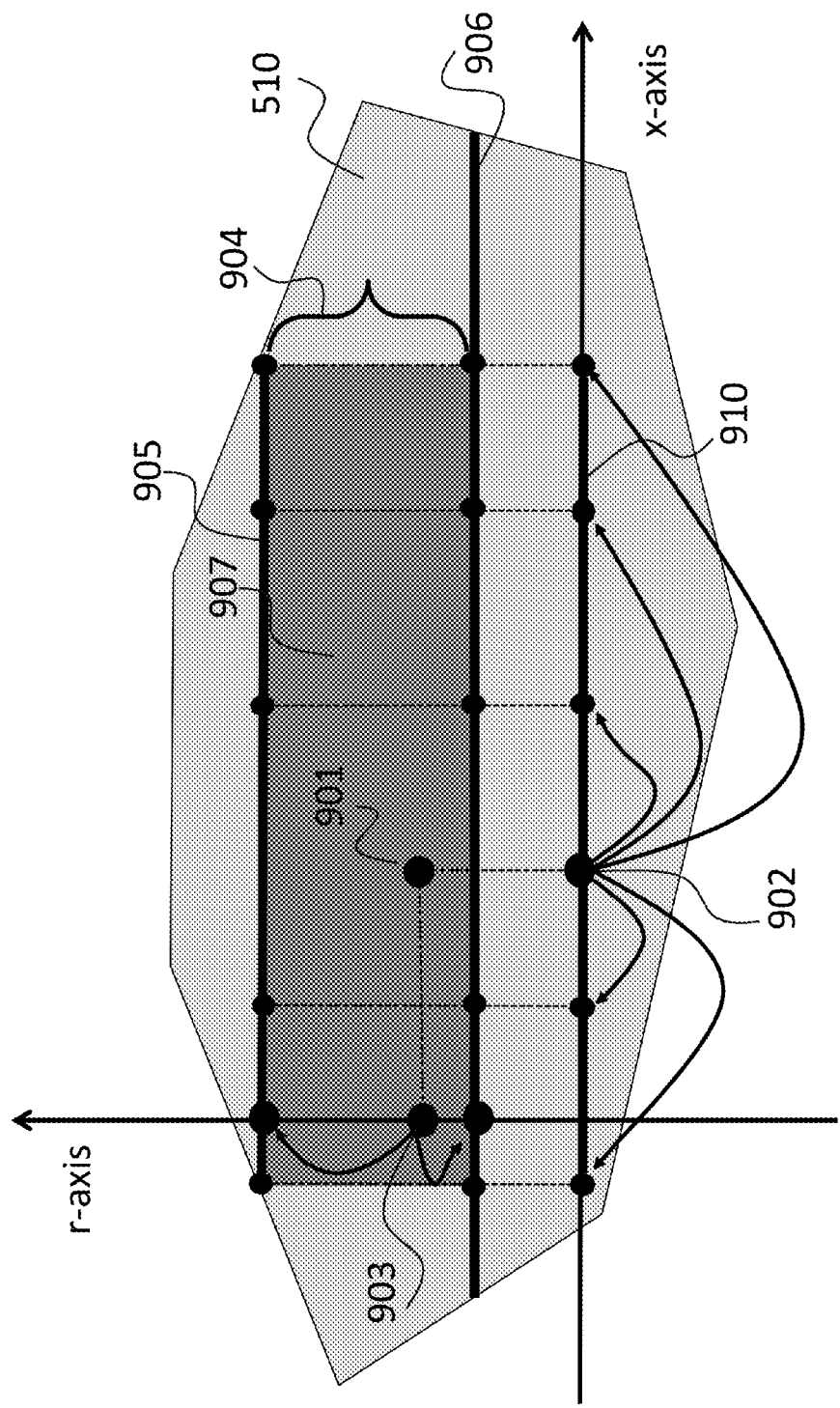
FIG. 9 is a schematic illustrating some principles behind the determination of the control invariant set used by some embodiments of the invention.

FIG. 9 illustrates the principles behind the determination of the subset 715 used by some embodiments of the invention. For example, one embodiment determines the control invariant set R as a subset 715 of the set of states for the second model of the motion of the vehicle and first model of the motion of the vehicle according to equations (5), (10) subject to constraints given by equations (7), (12) for disturbances $u_r \in U_r$ of the SC trajectory. The feasible set 710 of the state of the second model of the motion of the vehicle and the state of the first model of the motion of the vehicle is $$X_f = \{(x, x_r) : x \in X, x_r \in X_r\}. \quad (14)$$

In this example, the state of the vehicle 902 and the state of the desired trajectory 903 define a point in (x,r) 901 in the feasible region 710. Given the admissible set 904 of inputs to the state of the first model of the motion of the vehicle $$C_{u_r}(x_r) = \{u_r : A_r x_r + B_r u_r \in X_r\}, \quad (15)$$

the future state of the second model of the motion of the vehicle and the future state of the first model of the motion of the vehicle can be anywhere in the polyhedron 907, delimited by segments 905, 906. Thus, the controller can take any control action such that the future state of the second model of the motion of the vehicle 902 remains in the segment 910, so that the combination of the future state of the second model of the motion of the vehicle and the future state of the first model of the motion of the vehicle remains in the polyhedron 907.

If the set $C_{x,r}$ 907 is such that there is always a control action that keeps the state of the second model of the motion of the vehicle and the state of the first model of the motion of the vehicle 901 in the set 907 for the entire admissible range of the next states of the first model of the motion of the vehicle 904

$$R = \{(x,r) : \exists \Delta u \in U, Ax + B\Delta u + DC_r x_r \in X, \forall u_r \in U_r, A_r x_r + B_r u_r \in X_r\}, \quad (16)$$

it is possible to guarantee $$(Ax + B\Delta u + DC_r x_r \in X, A_r x_r + B_r u_r) \in R, \quad (17)$$

which guarantees that the constraints on the vehicle and on the performance, e.g., tracking error bounds, are satisfied. Notably, this procedure can be repeated at a next step because the update states are still inside R, hence recursively guaranteeing the constraints enforcement.

Figure 10:
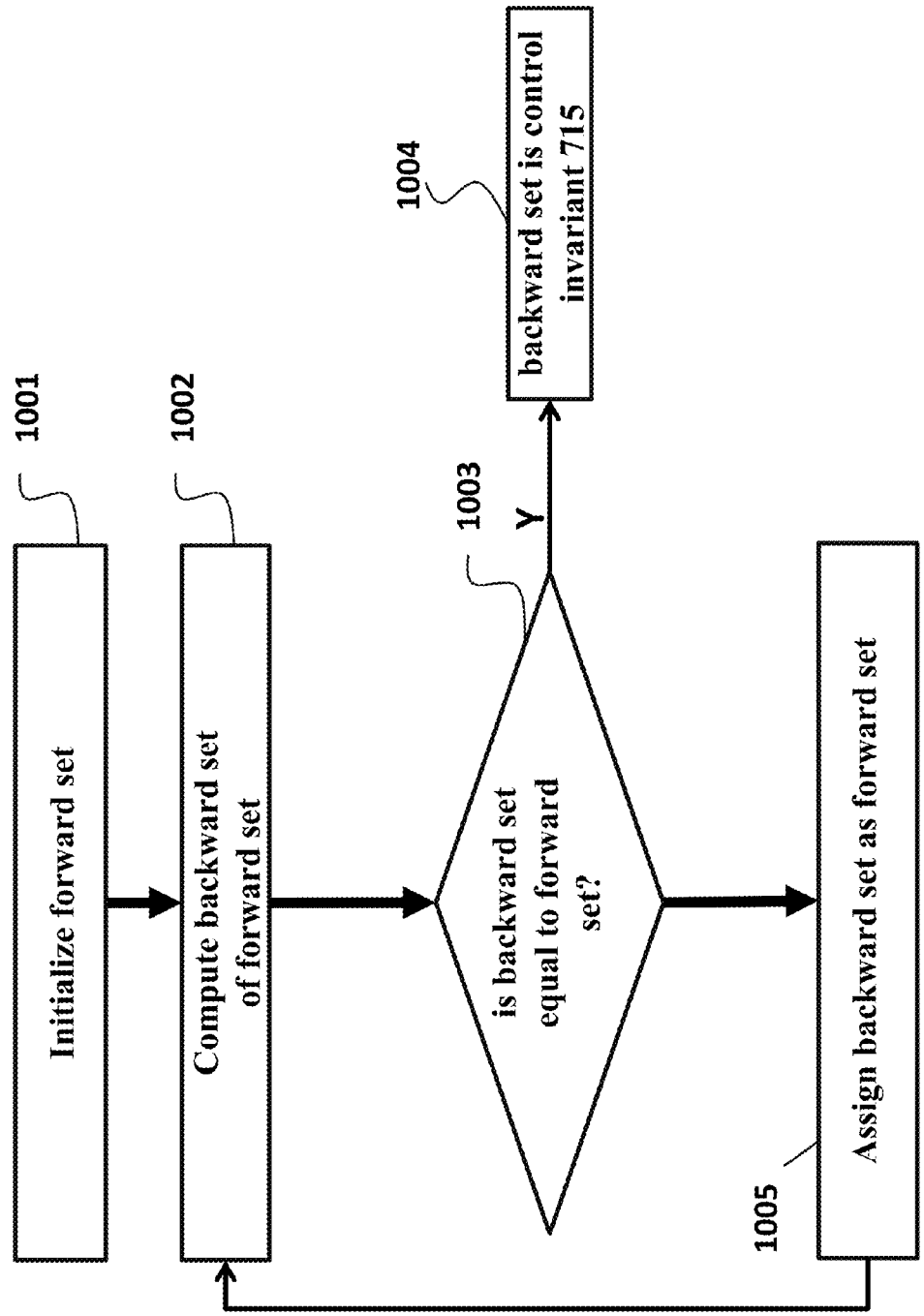
FIG. 10 and FIG. 11 are block diagrams of a method for selecting the control invariant set according to different embodiments of the invention.

FIG. 10 shows a block diagram of a method for selecting the region R according to one embodiment by performing iteratively a backward-reachable set computation until a termination condition is satisfied. The backward-reachable set computation removes all states from the current feasible region for which there is no control that maintains the state of the second model of the motion of the vehicle within the feasible region for the all the next states of first model of the motion of the vehicle.

For example, the backward-reachable set computation initializes 1001 at a step k=0 a current feasible set 1001 as the feasible region 510, $$\Omega_0 = \{(x,r) \in X_f\} \quad (18)$$

then determines 1002 a backward-reachable set of the states of the second model of the motion of the vehicle and first model of the motion of the vehicle that can be transitioned to the current feasible set for all the value of the admissible reference input according to $$\Omega_{k+1} = \text{Pre}(\Omega_k, C_{u_r}(x_r)) \cap \Omega_k \quad (19)$$

where $$\text{Pre}(\Omega_k, C_{u_r}(x_r)) = \{(x,r) : \exists \Delta u \in U, (Ax + B\Delta u + DC_r x_r, A_r x_r + B_r u_r) \in \Omega_k, \forall u_r \in C_{u_r}(x_r)\} \quad (20)$$

The computation of Equation (19) removes the states of the backward reachable set for which there exists no control action that keeps second model of the motion of the vehicle and first model of the motion of the vehicle into the current feasible set for all the admissible values of the SC trajectory input.

At step 1003 the computation tests if the backward-reachable set is equal to the current feasible set, i.e., $\Omega_{k+1} = \Omega_k$. If yes 1004, the backward-reachable set is the control invariant set 715, the computation stops and $R = \Omega_k$. In some embodiments, the test 1003 works as the termination condition that specifies that backward-reachable set is equal to the current feasible set when a difference between the backward-reachable set and the feasible set is below a threshold Otherwise 1005, the backward-reachable set is used as current feasible set in the next iteration (k=k+1) of the computation. The backward-reachable set computation of FIG. 10 returns the largest existing robust control invariant set. However, because the set of the allowed trajectory inputs is dependent on the states of the desired trajectory, in some situations, the control invariant set is not a single convex polyhedron but a group of convex polyhedra, which makes the use of such subset in a real time control difficult. Also, the backward-reachable set computation of FIG. 10 is computationally expansive and can take significant amount of time, e.g., days or even months.

Figure 11:
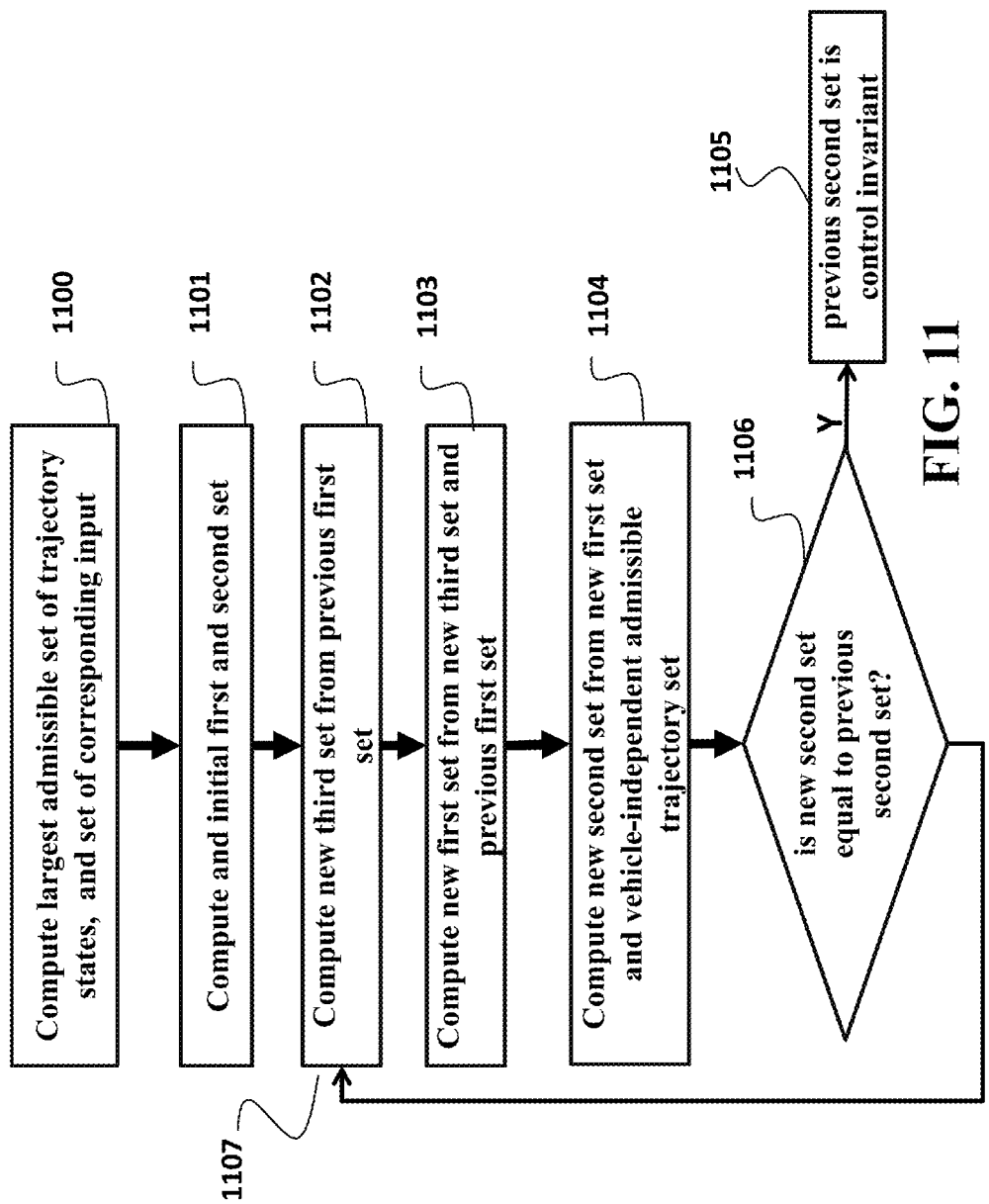

FIG. 11 shows a block diagram of an alternative method that determines the control invariant set R which is slightly smaller than the largest control invariant set of FIG. 10, but is a single convex polyhedron. Also, the method of FIG. 11 is much faster, e.g., can determine the control invariant set within minutes and/or hours.

The method first 1100 determines an admissible set of the states of the first model feasible in a future according to constraints on the first model including the first constraint. For example, the admissible set can be obtained from equation (5) while equation satisfying (7), which is itself invariant for equations (5), (7), $$C^* = \{x_r : \exists u_r \in U_r, A_r x_r + B_r u_r \in C^*\} \quad (21)$$

and the corresponding set of first model state dependent inputs that keep the trajectory state into such set $$C_{u_r}^*(x_r) = \{u_r : A_r x_r + B_r u_r \in C^*\} \quad (22)$$

Then, the method is initialized 1101 by computing a first set of feasible states of the first model and feasible states of the second model, e.g., according to $$\bar{\Omega}_0 = \{(x, x_r) : x \in X, x_r \in X_r\} \quad (23a)$$

and by computing a second set formed by an the intersection of the first set with the admissible set, e.g., according to $$\Omega_0 = \bar{\Omega}_0 \cap (\mathbb{R}^n \times C_d^*). \quad (23b)$$

Then, the method iterates 1108, where, at a current iteration, a third set is computed 1102 backward reachable computation of the first set while considering only the first constraint, i.e., other constraints are ignored $$\tilde{\Omega}_{k+1} = \{(x, x_r) : \exists \Delta u \in U, (Ax + B\Delta u + DC_r x_r, A_r x_r + B_r u_r) \in \bar{\Omega}_k, \forall u_r \in U_r\}. \quad (24)$$

Then, the method updates 1103 the first set to an intersection of the first set and the third set $$\bar{\Omega}_{k+1} = \tilde{\Omega}_{k+1} \cap \bar{\Omega}_k \quad (25)$$

and updates 1104 the second set to an intersection of the updated first set and the admissible set $$\Omega_{k+1} = \bar{\Omega}_{k+1} \cap (\mathbb{R}^n \times C_d^*). \quad (26)$$

For example, the intersection of the current second set and a vehicle-independent admissible trajectory set is formed as the entire space in the dimensions associated to x and the largest set of trajectory states in the dimensions associated to $x_r$.

The method determine 1105 the control invariant set $R = \Omega_k$ as the updated second set if a difference 1106 between the updated second set and the second set updated during a previous iteration is less than a threshold, e.g., $$\Omega_{k+1} = \Omega_k. \quad (27a)$$

Otherwise, the iterations continue. At conclusion, R is represented as a single convex polyhedron in the space of states of the second model of the motion of the vehicle x and states of the first model of the motion of the vehicle $x_r$.

$$R = \{(x, x_r) : H_x^R x + H_r^R x_r \leq K^R\} \quad (27b)$$

Figure 12:
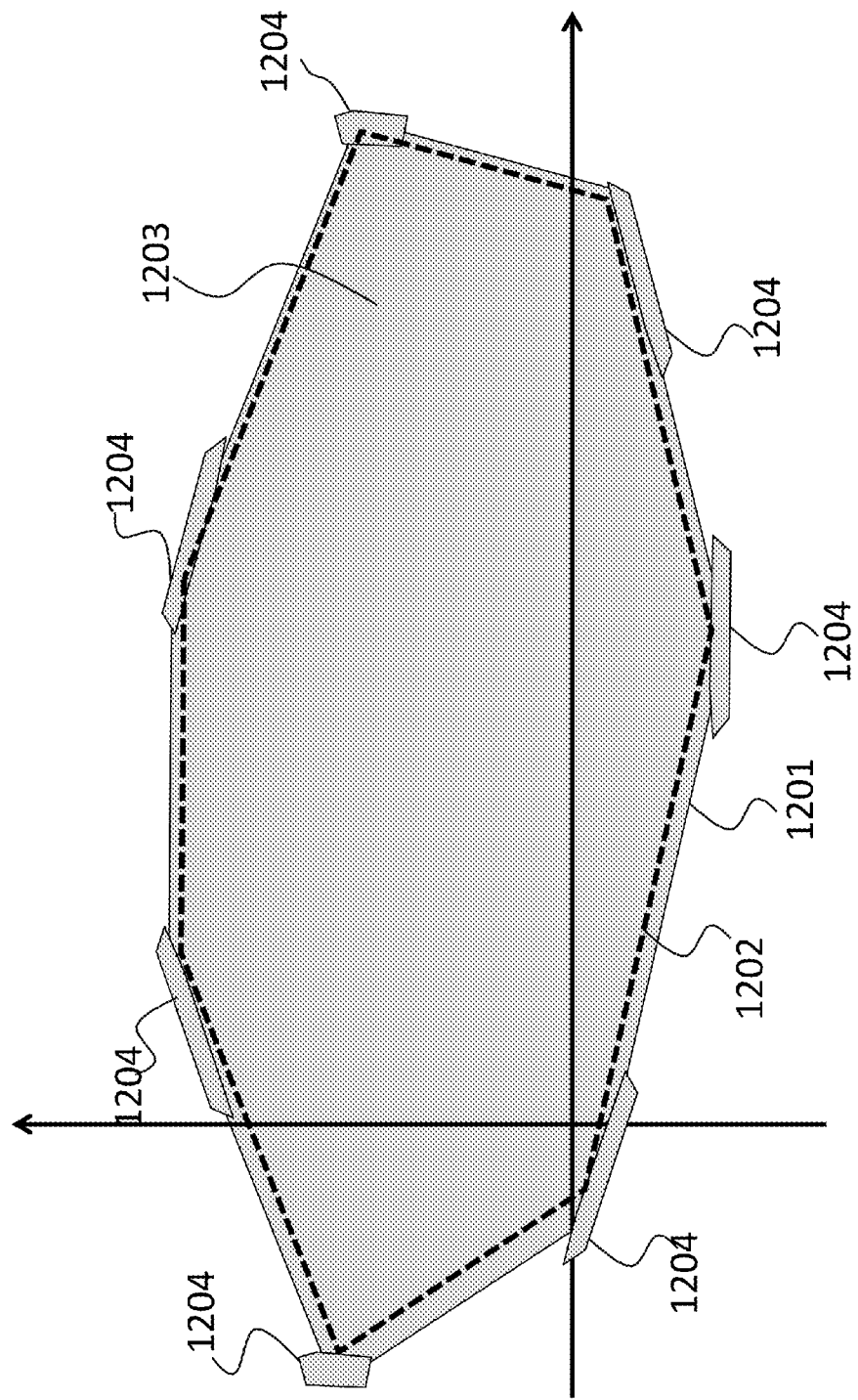
FIG. 12 is a schematic illustrating an effect of the method of FIG. 11 with respect to the method of FIG. 10.

FIG. 12 shows an effect of the method of FIG. 11 with respect to the method of FIG. 10. Because the dependence of the trajectory input $u_r$ on the state of the first model of the motion of the vehicle $x_r$ is ignored in certain parts of the computations, the set 1201 obtained by the method of FIG. 11 is smaller than the set 1202 obtained by the method of FIG. 10, but the subset 1201 is a single convex polyhedron, while the subset 1202 includes a larger convex polyhedron 1203 and multiple smaller convex polyhedral 1204 at the borders, the union of which is not convex.

Determining Property of the Desired Trajectory

If the control invariant set R computed with the methods described in FIG. 10 or FIG. 11 is empty, than it is not possible to achieve the measure of performance M for all trajectories satisfying the property P, where M is represented by the constraints (12) and P is represented by equation (5), and constraints (7). To that end, some embodiments update one or combination of the property P and the measure of performance M. For example, one embodiment determines the largest value of the first constraint allowing non-empty control invariant set. Another embodiment balance the value of the first constraint with the size of the control invariant set, e.g., reduce the value of the first constraint while increasing the size of the control invariant set.

Some embodiments are based on realization that the control invariant set R can be used to determine the property P and/or the measure of performance M. For instance, it is possible to parameterize the constraints (7) into $$x_r \in \sigma_1 X_r, u_r \in \sigma_2 U_r \quad (28)$$

where $\sigma_1$ and $\sigma_2$ are two non-negative scaling coefficients. Then one can search for the values of $\sigma_1$ and $\sigma_2$ that provide a non-empty region R and optimize a cost function dependent on $\sigma_1$ and $\sigma_2$ $$\max_{\sigma_1, \sigma_2} J(\sigma_1, \sigma_2)$$

$$\text{s.t. } R \neq \emptyset \quad (29)$$

An example, of the cost function may be the weighted value of the scaling components, which approximate the volume of the SC trajectory states and inputs that satisfy (7)

$$J(\sigma_1, \sigma_2) = \omega_1 \sigma_1 + \omega_2 \sigma_2 \quad (30)$$

In particular, for the case where equation (5) is specified by equation (6) and the constraints in (7) are specified by (8), one embodiment can fix the yaw rate constraints (8a) based on the allowed maximum yaw rate that the vehicle can achieve according to (10), (12) and determine the maximum yaw acceleration imposed by the trajectory (8b) by solving $$\max_{\sigma_2} \sigma_2$$

$$\text{s.t. } \dot{\omega}_{r_{min}} = -\dot{\omega}_{r_{min}} = \sigma_2 \dot{\omega}_{r_u}$$

$$R \neq \emptyset, \quad (31)$$

which provides the property P as the largest class of trajectories with bounded yaw rate according to (8a) for which the vehicle modeled as (10) can satisfied the measure of performance M modeled by (12).

A similar operation can be performed by keeping fixed equation (7) and changing equation (12) into $$x \in \sigma_1 X, \Delta u \in \sigma_2 U \quad (32)$$

and solving $$\min_{\sigma_1, \sigma_2} J(\sigma_1, \sigma_2)$$

$$\text{s.t. } R \neq \emptyset, \quad (33)$$

where for instance the cost function J is as in (30) to determine the optimal measure of performance M that can be achieved for trajectories within P.

Design of Vehicle Control for Trajectory Property and Measure of Performance

After the control invariant set R is determined, some embodiments determine the VC function the satisfies M for any trajectory in P. For example, from the control invariant set R for any given vehicle state x, and trajectory state $x_r$, the set of inputs that can be apply to guarantee for all future time instants M for any trajectory satisfying P is $$R_u(x,x_r)=\{\Delta u \in U:(Ax+B\Delta u+DC_rx_r,A_rx_r+Bu_r) \in R, \forall u_r \in U_r,A_rx_r+B_ru_r \in X_r\} \quad (34)$$

The VC can be designed to select any steering increment $\Delta u$ such that $$\Delta u \in R_u(x,x_r) \quad (35)$$

and determining the steering command as $$\delta(k)=\delta(k-1)+\Delta u(k). \quad (36)$$

In particular, the VC can be designed to select the steering increment $\Delta u$ that minimizes a certain performance objective, such as $$\min \Delta_u J(\Delta u,x,x_r)$$
$$s.t. \; \Delta u \in R_u(x,x_r), \quad (37)$$

where for instance J is a quadratic function of the next state of the second model of the motion of the vehicle and the control effort, $$J(u,x,x_r)=(Ax+B\Delta u+DC_rx_r)'W_1(Ax+B\Delta u+DC_rx_r)+\Delta u'W_2\Delta u, \quad (38)$$

where $W_1$, $W_2$ are matrix weights.

In some embodiments, the SC generates a trajectory ahead of time for some steps and hence the VC can optimize the control action not only for the current steps, but for N>1 future steps by solving $$\min_{\{\Delta u(h)\}_{h=k}^{k+N-1}} J(\{\Delta u(h)\}_{h=k}^{k+N-1},\{x(h)\}_{h=k}^{k+N},\{x_r(h)\}_{h=k}^{k+N})$$

$$s.t. \; x(k+h+1)=Ax(k+h)+B\Delta u(k+h)+DC_rx_r(k)$$

$$(x(k+h+1),x_r(k+h_1)) \in R,$$

$$\Delta u(k+h),x_r(k+h) \in R,$$

$$h=0, \ldots N-1 \quad (39)$$

where for instance $$J(\{\Delta u(h)\}_{h=k}^{k+N-1},\{x(h)\}_{h=k}^{k+N},\{x_r(h)\}_{h=k}^{k+N}) = \sum_{h=k}^{k+N-1} x(h)'W_1x(h) + \Delta u(h)'W_2 \Delta u(h) \quad (40)$$

or $$J(\{\Delta u(h)\}_{h=k}^{k+N-1},\{x(h)\}_{h=k}^{k+N},\{x_r(h)\}_{h=k}^{k+N}) = \sum_{h=k}^{k+N-1} (Ax(h) + B\Delta u(h) + DCx_r(h))'W_1(Ax(h) + B\Delta u(h) + DCx_r(h)) + \Delta'_u W_2 \Delta_u \quad (41)$$

and the constraint $$(x(k+h+1),x_r(k+h+1)) \in R, h=0, \ldots N-1 \quad (42)$$

ensures that the measure of performance M is satisfied for all future times for any trajectory satisfying P. The control actions obtained by solving (14) can be applied all or in part, until the VC is required to re-compute the control actions, so that the VC operates in a receding horizon way.

Figure 13:
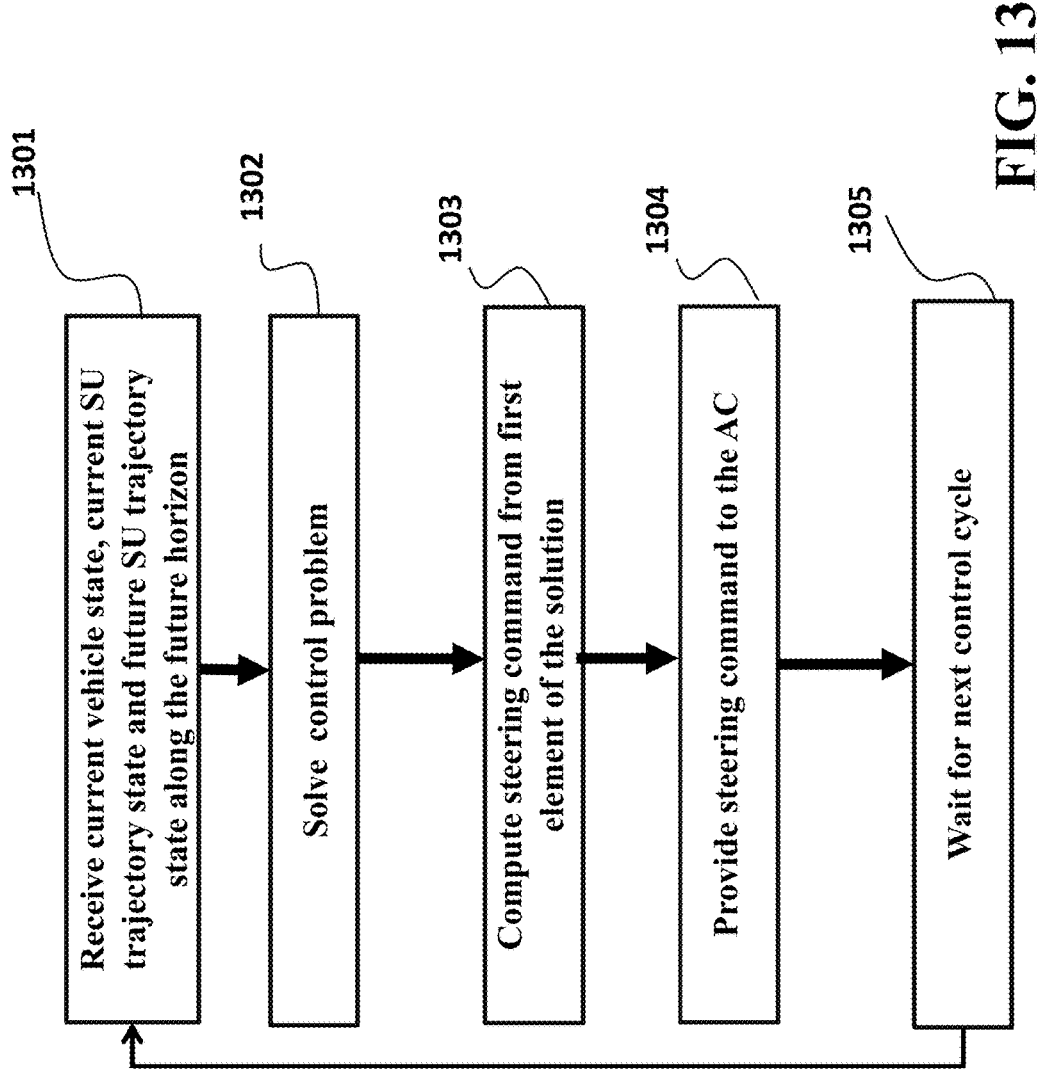
FIG. 13 is a block diagram of a vehicle control method according an embodiment of the invention.

FIG. 13 shows a block diagram of a control method of the VC according an embodiment, where the system operates in such a receding horizon way. At any control cycle, the vehicle state and the SC trajectory along a future prediction horizon of length N are acquired 1301 by the VC, and the control problem (39) is solved 1302. The first element of the resulting input sequence solution $\Delta u(k)$ is used 1303 to compute the steering command $\delta(\kappa)$ which is set to AC for being applied to the vehicle 1304 to the vehicle. Then, the VC waits 1305 for the next control cycle when the sequence is repeated.

Command Computation

The computation of the control command by the VC can be operated in one of several ways. Based on equation (35) a simple search can be operated, including a random selection of $\Delta u$ followed by a verification of the satisfaction of equation (35), and in case of negative answer, a repetition of the process until $\Delta u$ that satisfies equation (35) is selected. For the cases where a cost function is optimized, such as (37), (39) since the equations in (5), (10) are linear, in the case where equations (7), (12) are determined by linear constraints, and hence are convex polyhedral, R determined by the method in FIG. 11 is also a convex polyhedron, and hence the equation (37), (39) can be solved by computing the solution of a convex constrained quadratic program $$\min_{\Delta U} \Delta U' Q_p \Delta U + F' \Delta U$$
$$s.t. \quad G_p \Delta U \le K_p \quad (43)$$

where matrices $Q_p$, $G_p$, and vectors $F_p$, $K_p$, are constructed from equations (5), (7), (10), (12), (27b). One implementation formulates equations (37), (39) as the convex quadratic program (43) thanks to the resulting region R from the method in FIG. 11 being the convex polyhedron (27b). For instance, using the method in Figure (10) it is difficult to formulate equations (37), (39) as the convex quadratic program (43).

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling a vehicle, comprising:
selecting from a memory a first model of motion of vehicle, and a second model of the motion of the vehicle, wherein an order of the second model is higher that an order of the first model, wherein the order of a model is a number of state variables in the model;
selecting from the memory a first constraint on the first model of motion of the vehicle for moving on a desired trajectory of the vehicle, and selecting a control invariant set joining states of the first model with states of the second model, wherein for each combination of the states within the control invariant set there is at least one control action to the second model that maintains the state of the second model within the control invariant set for every modification of the state of the first model satisfying the first constraint;
determining, using the first model, a portion of the desired trajectory such that the first constraint is satisfied;
determining, using the second model, a sequence of commands for moving the vehicle along the portion of the desired trajectory, such that the sequence of commands maintain a sequence of the states of the second model and a sequence of the states of the first model determined by the portion of the desired trajectory within the control invariant set; and
controlling the vehicle using at least one command from the sequence of commands, wherein the steps of the method are performed using a processor operatively connected to the memory.

2. The method of claim 1, further comprising:
determining iteratively the control invariant set using a backward-reachable set computation starting from a feasible set, wherein each iteration comprises:
determining a backward-reachable set, such that for each state within the backward-reachable set there is at least one control action maintaining the state of the second model within the feasible set for every modification of the state of the first model satisfying the first constraint; and
replacing the feasible set with the backward-reachable set, wherein the iterations are performed until a termination condition is met.

3. The method of claim 2, wherein the termination condition specifies that a difference between the backward-reachable set and the feasible set is below a threshold.

4. The method of claim 1, further comprising:
determining an admissible set of the states of the first model feasible in a future according to constraints on the first model including the first constraint;
determining iteratively the control invariant set starting from initial values of a first set of feasible states of the first model and feasible states of the second model and a second set formed by an the intersection of the first set with the admissible set, wherein a current iteration comprises:
constructing a third set by backward reachable computation of the first set while considering only the first constraint;
updating the first set to an intersection of the first set and the third set;
updating the second set to an intersection of the updated first set and the admissible set; and determining the control invariant set as the updated second set if a difference between the updated second set and the second set updated during a previous iteration is less than a threshold.

5. The method of claim 1, further comprising:
selecting a feasible command satisfying physical constraints on the motion of the vehicle;
estimating a transition of the vehicle from a current state to a future state according to the feasible command; and
selecting the feasible command as the command for controlling the vehicle if a combination of the future state of the vehicle and a first element from the sequence of the states of the first model belongs to the control invariant set; and otherwise
selecting a different feasible command and repeating the estimating and the selecting steps.

6. The method of claim 5, wherein the different feasible command is selected to reduce a distance between the future state determined by the different feasible command with the broader of the control invariant set.

7. The method of claim 1, further comprising:
formulating an optimization problem optimizing a performance of the vehicle subject to constraints including a combination of the future state of the vehicle and a first element from the sequence of the states of the first model belonging to the control invariant set; and
selecting the sequence of commands for moving the vehicle by solving the optimization problem.

8. The method of claim 7, wherein the performance of the vehicle is one or a combination of reducing lateral acceleration of the vehicle, reducing yaw rate of the vehicle, reducing lateral displacement from the desired trajectory, and reducing steering wheel actuation power.

9. The method of claim 1, wherein the first constraint does not limit one of the state variables of the first model.

10. The method of claim 1, wherein the first constraint determines transitions between the states of the first model.

11. The method of claim 1, wherein the first constraint includes one or a combination of a constraint on a change of a curvature of the desired trajectory, and a constraint on a change of a yaw rate of transitioning the first model along the desired trajectory.

12. The method of claim 1, further comprising: determining the largest value of the first constraint allowing non-empty control invariant set.

13. The method of claim 12, further comprising: reducing the value of the first constraint while increasing the size of the control invariant set.

14. A controller for controlling a vehicle, comprising:
a memory to store a first model of motion of vehicle, to store a second model of the motion of the vehicle, wherein an order of the second model is higher that an order of the first model, wherein the order of a model is a number of state variables in the model, to store a first constraint on the first model for moving along the desired trajectory of the vehicle, and to store a control invariant set joining states of the first model with states of the second model, wherein for each combination of the states within the control invariant set there is at least one control action to the second model that maintains the state of the second model within the control invariant set for every modification of the state of the first model satisfying the first constraint;

a supervisory controller to determine using the first model a portion of the desired trajectory satisfying the first constraint;

a vehicle controller to determine, using the second model, a sequence of commands for moving the vehicle along the portion of the desired trajectory, such that the sequence of commands maintain a sequence of the states of the second model and a sequence of the states of the first model determined by the portion of the desired trajectory within the control invariant set; and an actuator controller to control the vehicle using at least one command from the sequence of commands.

15. The controller of claim 14, wherein the vehicle controller is configured for selecting a feasible command satisfying physical constraints on the motion of the vehicle;

estimating a transition of the vehicle from a current state to a future state according to the command; and selecting the feasible command as the command for controlling the vehicle if a combination of the future state of the vehicle and a first element from the sequence of the states of the first model belongs to the control invariant set; and otherwise selecting a different feasible command and repeating the estimating and the selecting steps.

16. The controller of claim 15, wherein the different feasible command is selected to reduce a distance between the future state determined by the different feasible command with the boarder of the control invariant set.

17. The controller of claim 14, wherein the vehicle controller is configured for formulating an optimization problem optimizing a performance of the vehicle subject to constraints including a combination of the future state of the vehicle and a first element from the sequence of the states of the first model belonging to the control invariant set; and selecting the sequence of commands for moving the vehicle by solving the optimization problem.

18. The controller of claim 17, wherein the performance of the vehicle is one or a combination of reducing lateral acceleration of the vehicle, reducing yaw rate of the vehicle, reducing lateral displacement from the desired trajectory, and reducing steering wheel actuation power.

19. The controller of claim 14, wherein the first constraint includes one or a combination of a constraint on a change of a curvature of the desired trajectory, and a constraint on a change of a yaw rate of transitioning the first model along the desired trajectory.

20. A non-transitory computer readable memory embodied thereon a program executable by a processor for performing a method, the method comprising:

selecting from the memory a first model of motion of vehicle, and a second model of the motion of the vehicle, wherein an order of the second model is higher that an order of the first model, wherein the order of a model is a number of state variables in the model;

selecting from the memory a first constraint on the first model for moving exactly on the desired trajectory of the vehicle, and selecting a control invariant set joining states of the first model with states of the second model, wherein for each combination of the states within the control invariant set there is at least one control action to the second model that maintains the state of the second model within the control invariant set for every modification of the state of the first model satisfying the first constraint;

determining using the first model a portion of the desired trajectory satisfying the first constraint;

determining, using the second model, a sequence of commands for moving the vehicle along the portion of the desired trajectory, such that the sequence of commands maintain a sequence of the states of the second model and a sequence of the states of the first model determined by the portion of the desired trajectory within the control invariant set; and controlling the vehicle using at least one command from the sequence of commands.

\* \* \* \* \*